(12) United States Patent
Takedomi et al.

(10) Patent No.: US 6,677,728 B2
(45) Date of Patent: Jan. 13, 2004

(54) BATTERY BOX AND BATTERY HOLDER HAVING DETACHABLE RING-SHAPED MEMBERS

(75) Inventors: Harumi Takedomi, Utsunomiya (JP); Eiji Koike, Utsunomiya (JP); Keishi Kousaka, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/408,580

(22) Filed: Apr. 8, 2003

(65) Prior Publication Data

US 2003/0193313 A1 Oct. 16, 2003

(30) Foreign Application Priority Data

Apr. 12, 2002 (JP) .......................... 2002-110903
Apr. 12, 2002 (JP) .......................... 2002-110904

(51) Int. Cl.$^7$ ................................ H02J 7/00
(52) U.S. Cl. ........................ 320/112; 320/107
(58) Field of Search ................ 320/112, 107, 320/116; 429/99, 96, 97, 100

(56) References Cited

U.S. PATENT DOCUMENTS 6,111,387 A    8/2000  Kouzu et al. ............. 320/107
6,211,645 B1   4/2001  Kouzu et al. ............. 320/107
6,211,646 B1 * 4/2001  Kouzu et al. ............. 320/107
6,340,877 B1 * 1/2002  Mita et al. ............... 320/112

FOREIGN PATENT DOCUMENTS

JP    9-86188      3/1997
JP    10-255859    9/1998
JP    2000-182582  6/2000

* cited by examiner

Primary Examiner—Lawrence Luk
(74) Attorney, Agent, or Firm—Armstrong, Westerman & Hattori, LLP

(57) ABSTRACT

A small battery box, in which arrangement of cells can be easily changed, for suppressing nonuniformity in temperature distribution between the cells. The box has a container having upper, lower, front, rear, and side portions which can be disassembled; a battery holder having members which are detachably connected in a manner such that central axes of the cells are parallel to a direction along which the side portions face each other and the cells are arranged in a zig-zag matrix form; a shielding member, near a coolant supply opening in the front portion, for changing the flow direction of the coolant and for preventing the coolant from directly blowing onto the cells; and a control member, near a coolant discharge opening in the rear portion, for changing the coolant flow direction in a manner such that the coolant flows towards the rear side of each cell near the discharge opening.

9 Claims, 18 Drawing Sheets

BATTERY BOX AND BATTERY HOLDER HAVING DETACHABLE RING-SHAPED MEMBERS

BACKGROUND OF THE INVENTION

1. Field of the Invention

The present invention relates to a battery box for containing a plurality of cells and a battery holder for holding the cells.

2. Description of the Related Art

In a known battery structure (refer to a battery structure employed in an electric vehicle, disclosed in Japanese Unexamined Patent Application, First Publication No. Hei 9-86188), (i) a plurality of cylindrical battery cells, held by rib walls, are arranged in a box-shaped battery case in a manner such that the central axes of the battery cells pass through lattice points which are positioned on a specific lattice, and (ii) air vents, through which cooling air passes, are formed in the upper and lower walls (of the battery case) which face each other along the direction perpendicular to the central axes of the battery cells, so as to ventilate the inside of the battery case with the cooling air in the vertical direction and to cool the battery cells held by the rib walls.

In the above-explained conventional battery structure having the air vents provided in the upper and lower walls, the cooling condition is different between the battery cells positioned in the vicinity of the air vents at the cooling-air drawing side and the battery cells positioned in the vicinity of the air vents at the cooling-air discharging side, thereby producing a large temperature difference.

For example, in comparison with the vicinity of the air vents at the cooling-air drawing side, flowability around the battery cells is degraded in the vicinity of the air vents at the cooling-air discharging side, thereby degrading the degree of cooling for the battery cells.

Also in the above-explained conventional battery structure in which a plurality of the battery cells are arranged in a lattice pattern, the battery case should be large and thus it is difficult to improve the flexibility for building the battery case into a vehicle such as an electric car.

In addition, the rib walls for holding the battery cells in the battery case are formed integrally with the battery case; thus, the structure of the battery case is complicated and it is difficult to suitably modify the arrangement of the battery cells in the battery case.

SUMMARY OF THE INVENTION

In consideration of the above circumstances, the first object of the present invention is to provide a battery box for containing a plurality of cells and suppressing nonuniformity in the temperature distribution between the cells.

The second object of the present invention is to provide a battery box and a cell holder, by which the battery box for containing a plurality of cells can be smaller and the arrangement of the cells can be flexibly and easily modified.

Therefore, the present invention provides a battery box (e.g., the battery box 10 in an embodiment explained below) comprising:

- a container (refer to the internal space 21 in the embodiment explained below) formed by connecting an upper portion (e.g., the upper portion 11 in the embodiment explained below), a lower portion (e.g., the lower portion 12 in the embodiment explained below), a front portion (e.g., the front portion 13 in the embodiment explained below), a rear portion (e.g., the rear portion 14 in the embodiment explained below), and two side portions (e.g., the right portion 15 and the left portion 16 in the embodiment explained below), where the container can be disassembled and the front portion has a coolant supply opening (e.g., each front opening 22 in the embodiment explained below) from which a coolant is drawn into the container, and the rear portion has a coolant discharge opening (e.g., each rear opening 23 in the embodiment explained below) from which the coolant is discharged from the container;
- a battery holder (e.g., the battery holder 17 in the embodiment explained below) having a plurality of cell holding members (e.g., the grommets 61, ..., 61 in the embodiment explained below) for holding a plurality of cells (e.g., the battery cells 18, ... 18 in the embodiment explained below) in the container, wherein the cell holding members are detachably connected to each other in a manner such that central axes of the cells held by the cell holding members are parallel to a direction along which the two side portions face each other and that the cells are arranged in a zig-zag matrix form in a section perpendicular to the central axes of the cells;
- a shielding member (e.g., the first shielding member 43, the second shielding member 44, or the third shielding member 45 in the embodiment explained below), provided in the vicinity of the coolant supply opening, for changing the flow direction of the coolant which is drawn from the coolant supply opening into the container, and for preventing the coolant from directly blowing onto at least one of the cells in the vicinity of the coolant supply opening; and
- a flow control member (e.g., the first flow control member 32 or the second flow control member 33 in the embodiment explained below), provided in the vicinity of the coolant discharge opening, for changing the flow direction of the coolant in a manner such that the coolant flows towards the rear side of at least one of the cells in the vicinity of the coolant discharge opening.

According to the above battery box, the cells can be arranged in a zig-zag matrix form by using the cell holding members, so that the arrangement efficiency of the cells in the container can be improved and the battery box can be smaller. In addition, the arrangement density with respect to the cells in the container is relatively increased, and accordingly, even when the volume of the space through which the cooling air passes relatively decreases, the shielding member in the vicinity of the coolant supply opening and the flow control member in the vicinity of the coolant discharge opening prevent nonuniformity in the temperature distribution, thereby improving the cooling efficiency.

That is, the shielding member may be arranged in a manner such that the shielding member interrupts the flow of the coolant, which is directed towards the surface of a cell which faces the coolant supply opening, so as to prevent the coolant from directly blowing onto the cell. In this case, it is possible to prevent (i) the cell in the vicinity of the coolant supply opening from being excessively cooled, and (ii) the temperature of the coolant in the vicinity of the coolant supply opening from excessively increasing.

In addition, in order to improve the cooling efficiency of the coolant in the vicinity of the coolant discharge opening, the flow control member is arranged, which can narrow the coolant passage around a target cell and increase the flow rate of the coolant. Accordingly, desired capability for cooling the cell in the vicinity of the coolant discharge opening can be obtained, thereby suppressing the temperature of the cell in the vicinity of the coolant discharge opening from being relatively increased.

In the above battery box, each of the front and rear portions may have a support portion (e.g., the concave portion 47 and the convex portion 48 in the embodiment explained below) for supporting the battery holder. According to this structure, the battery holder is fixed between the front and rear portions in the container. Therefore, the battery holder can be easily fixed simply by providing the support portion at each of the front and rear portions (i.e., constituents of the container), without providing any additional members between which the battery holder can be fixed.

As a preferable example, each cell holding member of the battery holder has at least a pair of a convex portion (e.g., the convex portion 51 in the embodiment explained below) and a concave portion (e.g., the concave portion 52 in the embodiment explained below) which are provided on an outer surface of the cell holding member; and the cell holding members are detachably connected to each other by fitting the convex portion of one cell holding member into the concave portion of another cell holding member.

According to this structure, when a plurality of cell holding members are connected to each other, any two cell holding members are fastened to each other by respectively engaging the convex portion and the concave portion of one of the members with the concave portion and the convex portion of the other member. Here, each convex portion is detachably fitted into the concave portion of another cell holding member; thus, the cell holding members can be easily connected or disconnected, and the arrangement of the cell holding members in the container can be easily modified or changed. In addition, if the above support portion provided at each of the front and rear portions is a pair of a convex portion and a concave portion, the front and rear portions can be easily connected to the battery holder and also easily disconnected from the battery holder.

The present invention also provides a battery holder comprising a plurality of cell holding members for holding a plurality of cells, wherein:

the cell holding members are detachably connected to each other in a manner such that central axes of the cells held by the cell holding members are parallel to a direction along which the two side portions face each other and that the cells are arranged in a zig-zag matrix form in a section perpendicular to the central axes of the cells; and each cell holding member has a ring-shaped member (e.g., the grommet 61 in the embodiment explained below) into which one of the cells is insertable, wherein the ring-shaped member has a contact face (e.g., the contact face 61a in the embodiment explained below) on an outer-peripheral surface (e.g., the outer-peripheral surface 61A in the embodiment explained below) of the ring-shaped member, and the contact face is contactable with the ring-shaped member of another cell holding member when the cell holding members are connected to each other.

According to the above battery holder, the cells can be arranged in a zig-zag matrix form by using the cell holding members, so that the arrangement efficiency of the cells can be improved. Here, each ring-shaped member has a contact face on the outer-peripheral surface of the ring-shaped member. Therefore, when the ring-shaped members are connected to each other, positioning of each member at a specific position can be easily performed by arranging the ring-shaped members in a manner such that the contact faces of each member are made to contact each other.

In a typical example, the battery holder further comprises:

at least one coupling member (e.g., the coupling member 62 in the embodiment explained below) which is provided for connecting two of the ring-shaped members, wherein:

the coupling member has two ends, one end being connected to one of the two ring-shaped members and the other end being connected to the other ring-shaped member, in a manner such that the two ends are both rotatable around a rotation center; and the contact face of one of the two ring-shaped members is contactable with the contact face of the other ring-shaped member by rotating the two ends.

According to this structure, it is possible to easily make the contact face of one of the ring-shaped members contact the contact face of the other ring-shaped member simply by rotating the two ends of the coupling member. Therefore, the specific positioning of the cell holding members can be more easily performed.

In a preferable example, each ring-shaped member has at least a pair of a convex portion and a concave portion which are provided on the contact face; and the cell holding members are detachably connected to each other by fitting the convex portion of the ring-shaped member of one cell holding member into the concave portion of the ring-shaped member of another cell holding member.

According to this structure, when a plurality of cell holding members are connected to each other, the cell holding members can be easily fastened to each other simply by making the contact faces of the ring-shaped members contact each other, by which the convex portion and the concave portion of each ring-shaped member are respectively engaged with the concave portion and the convex portion of another member. Here, each convex portion is detachably fitted into the concave portion of another ring-shaped member; thus, the cell holding members can be easily connected or disconnected, and the arrangement of the cell holding members can be easily modified or changed.

Typically, the battery holder is made of an electrically insulating material. In this case, desired electrically-insulating capability can be secured.

In addition, each ring-shaped member may have a protruding portion (e.g., the protruding portion 53 in the embodiment explained below) on an inner-peripheral surface (e.g., the inner-peripheral surface 61B in the embodiment explained below) of the ring-shaped member, wherein the protruding portion contacts an outer-peripheral surface (e.g., the outer-peripheral surface 18A in the embodiment explained below) of the cell inserted into the ring-shaped member.

In this case, a suitable space can be produced between the inner-peripheral surface of the ring-shaped member and the outer-peripheral surface of the cell inserted into the ring-shaped member. In addition, the ring-shaped member contacts the outer-peripheral surface of the cell via the protruding portion; thus, the distance along which the ring-shaped member contacts the outer-peripheral surface of the cell can be increased depending on the shape of the protruding portion, thereby further improving the electrical insulation performance. Furthermore, when the cell is inserted into the ring-shaped member, the ring-shaped member deforms, so that the cell can be easily attached to the ring-shaped member.

The present invention also provides a battery box into which a battery holder as explained in the preferable example is detachably built, the battery box comprising;

a container formed by connecting an upper portion, a lower portion, a front portion, a rear portion, and two side portions, wherein the container can be disassembled and each of the upper, lower, front, and rear portions has an concave portion (e.g., the concave portion 35 or the concave portion 47 in the embodiment explained below) and a convex portion (e.g., the convex portion 36 and the convex portion 48 in the embodiment explained below) which are detachably engaged with the convex portion and the concave portion of the ring-shaped member of one of the cell holding member.

According to the above battery box, the concave portion and the convex portion provided at each of the upper, lower, front, and rear portions has an concave portion can be respectively and detachably engaged with the convex portion and the concave portion provided on each ring-shaped member, so that the battery holder can be easily built into the container and also easily detached from the container.

DESCRIPTION OF THE PREFERRED EMBODIMENTS

Hereinafter, an embodiment according to the present invention will be explained with reference to the drawings.

Figure 1:
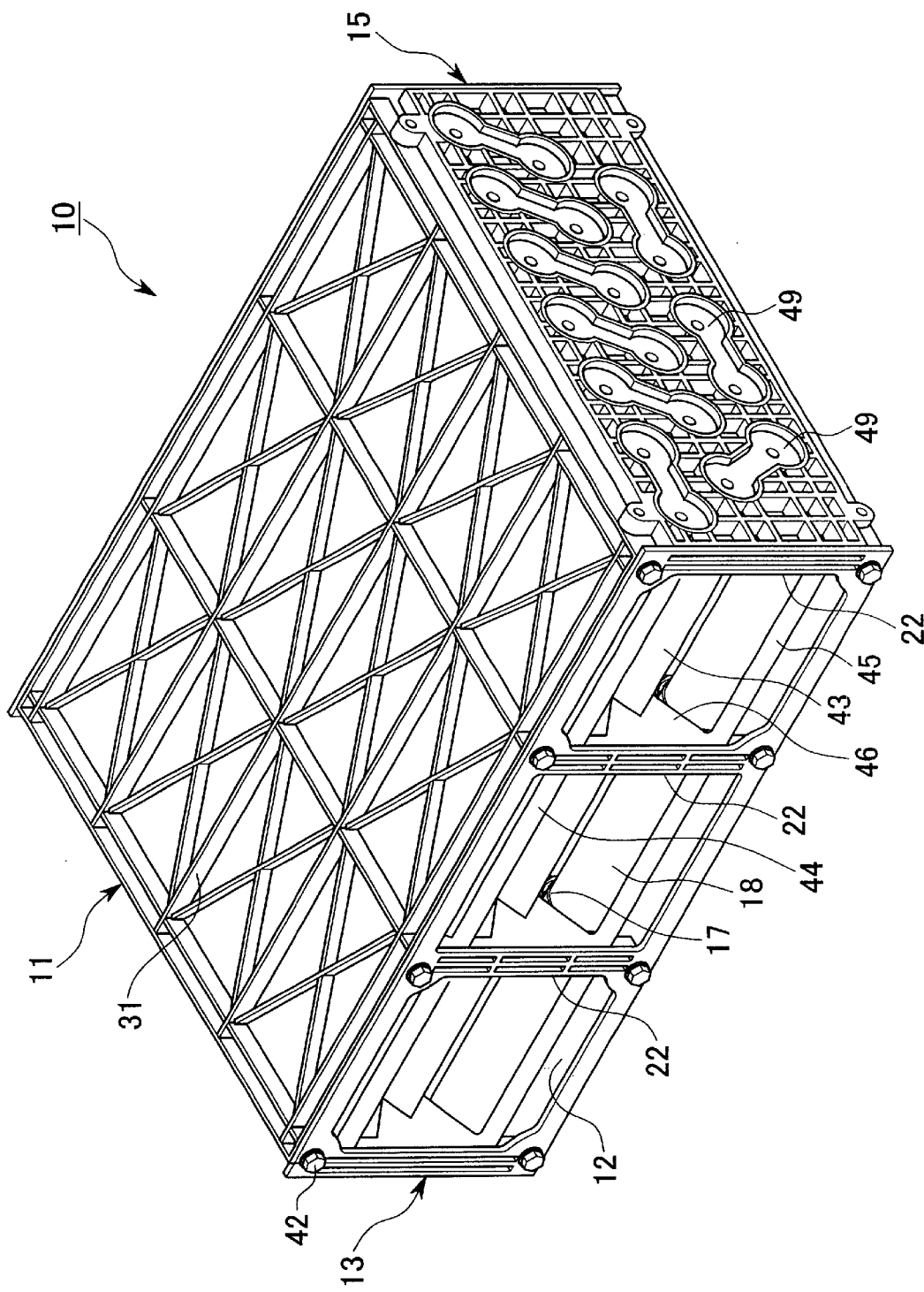
FIG. 1 is a perspective view of a battery box as an embodiment of the present invention.
Figure 2:
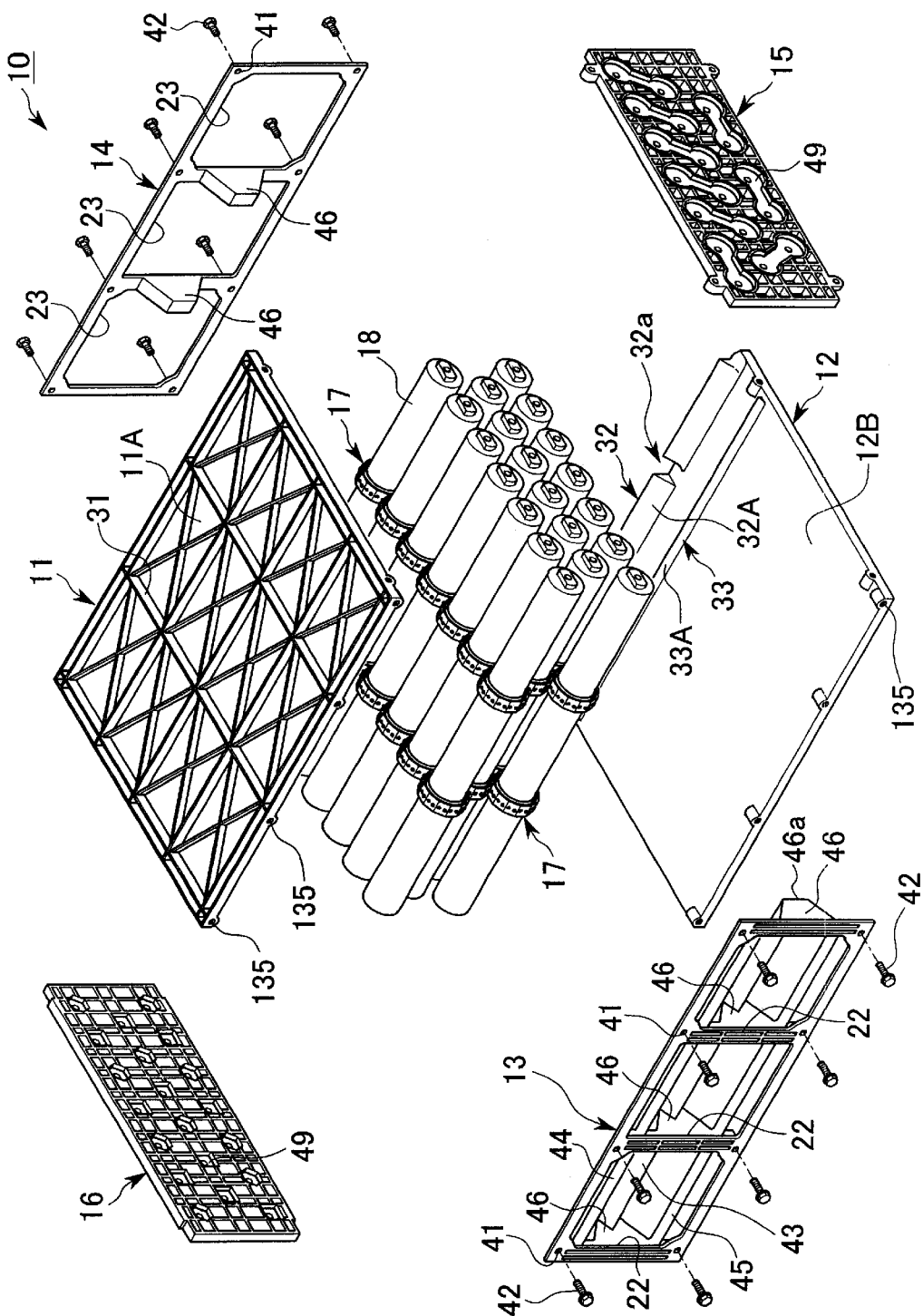
FIG. 2 is an exploded perspective view of the battery box in FIG. 1.
Figure 3:
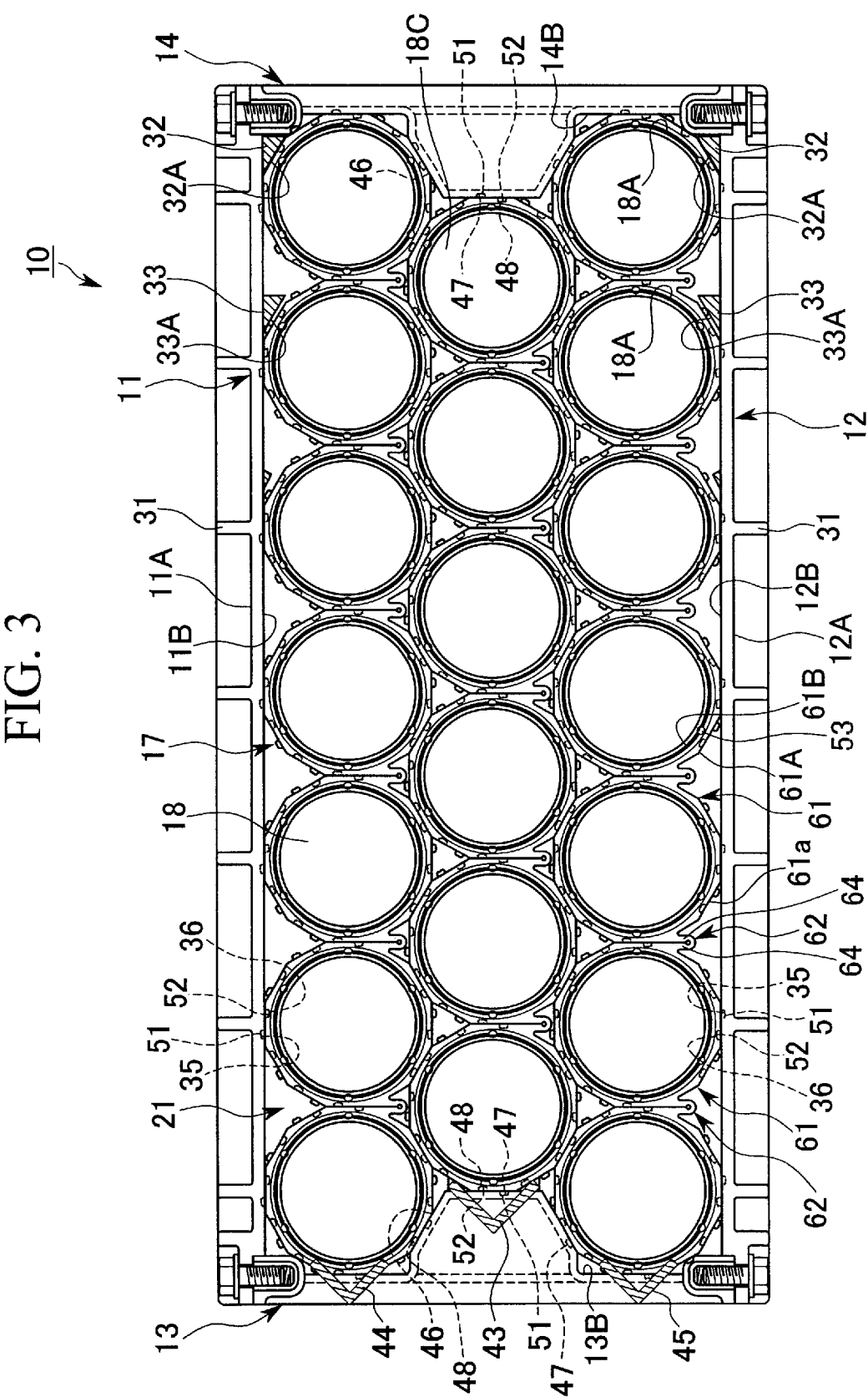
FIG. 3 is a sectional view of the battery box in FIG. 1.
Figure 4:
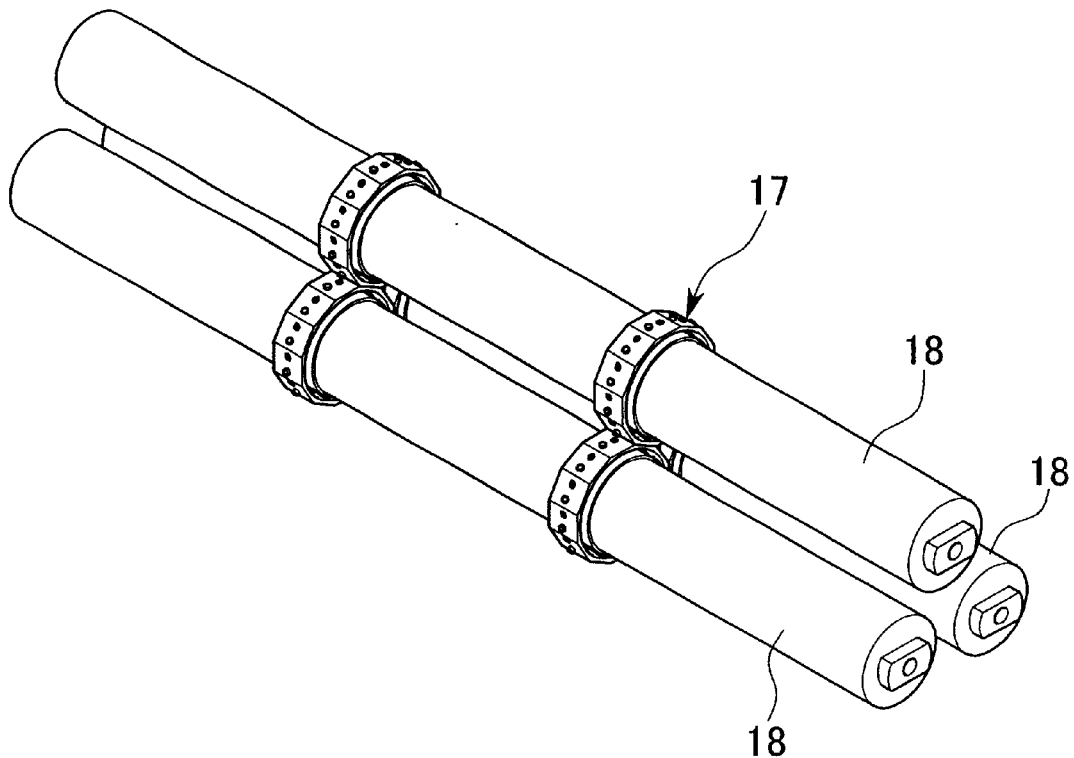
FIG. 4 is a perspective view showing the battery cells held by a battery holder.
Figure 5:
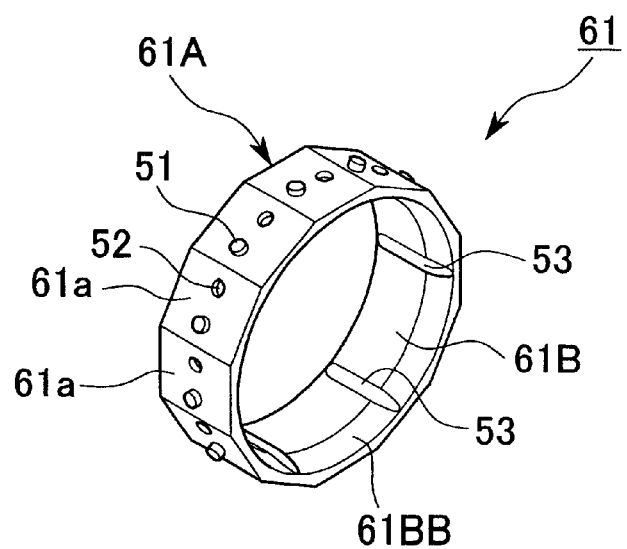
FIG. 5 is a perspective view showing a grommet.
Figure 6:
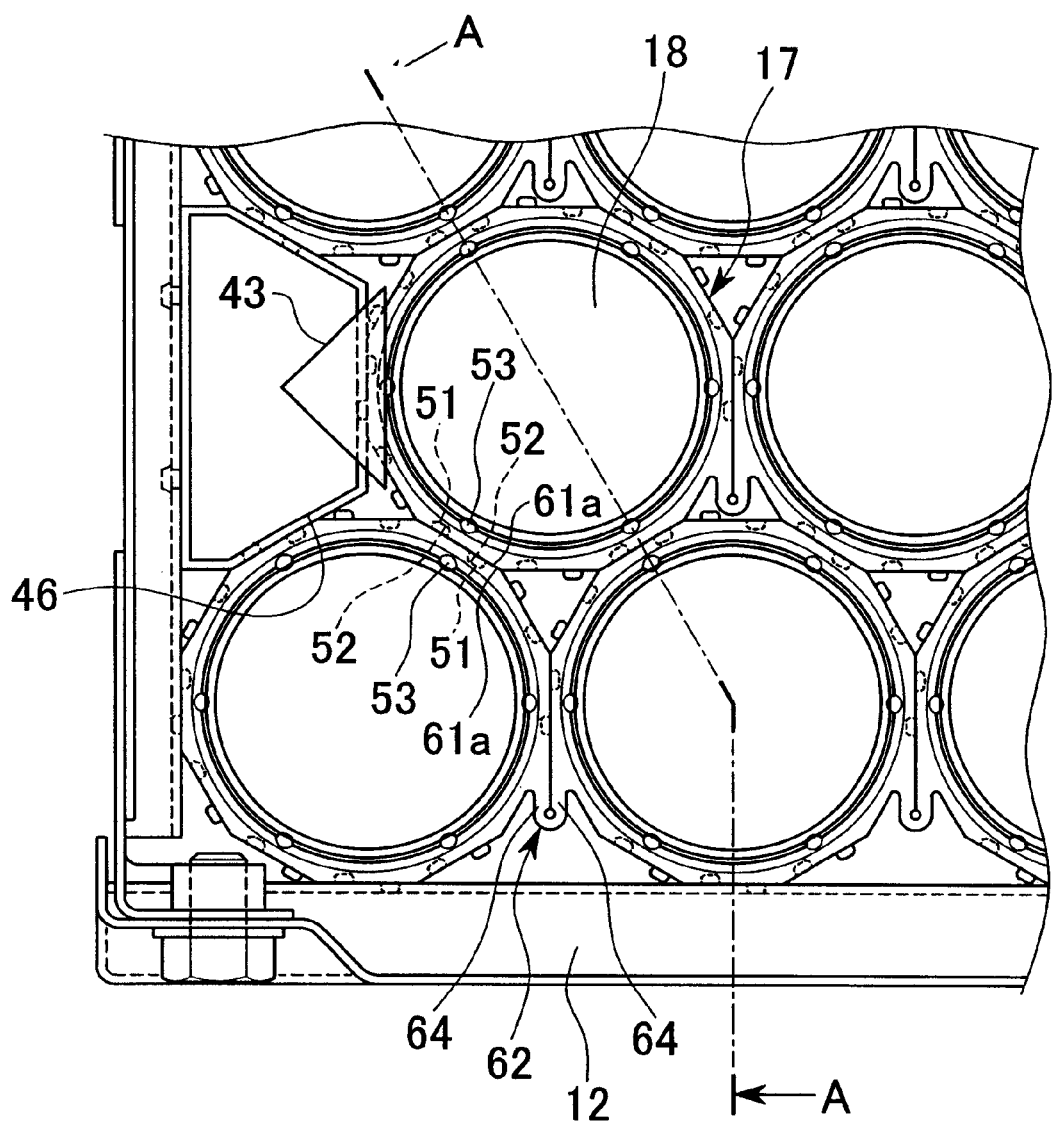
FIG. 6 is an enlarged sectional view showing a representative portion of the battery box in FIG. 3.
Figure 7:
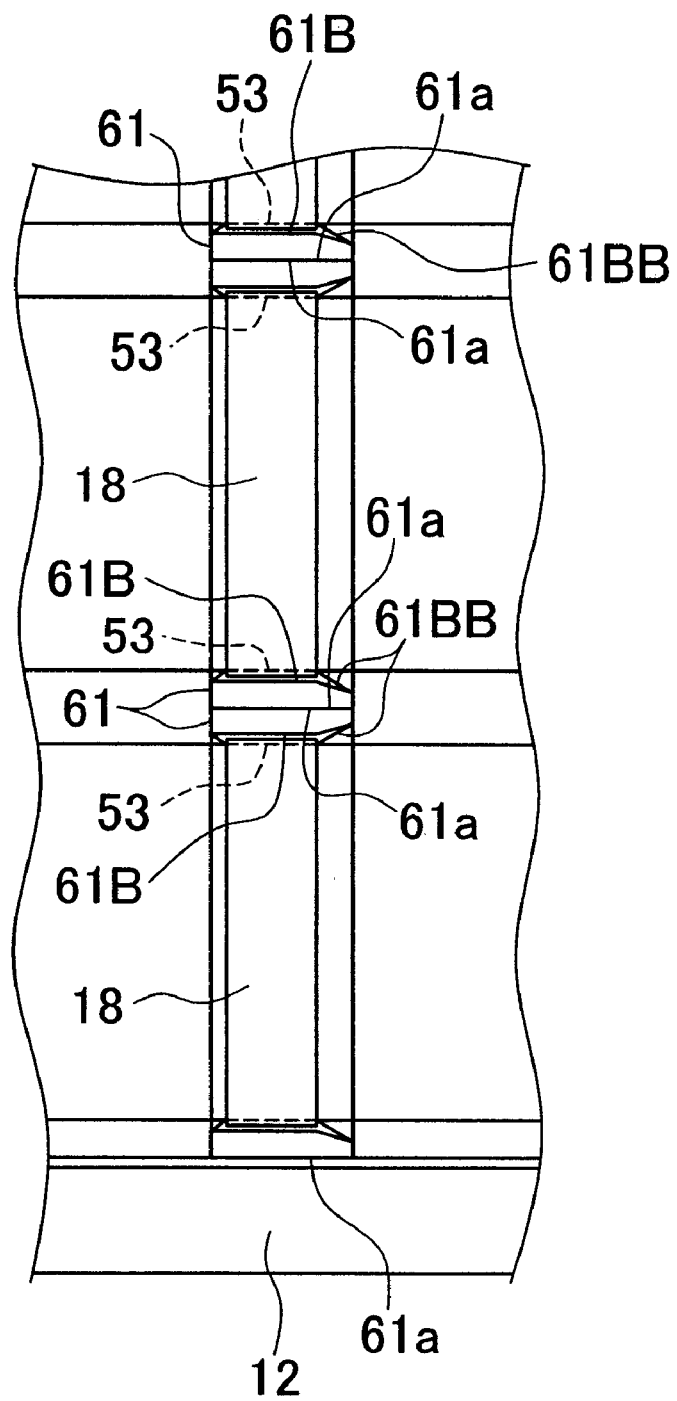
FIG. 7 is a sectional view along line A—A in FIG. 6.
Figure 8:
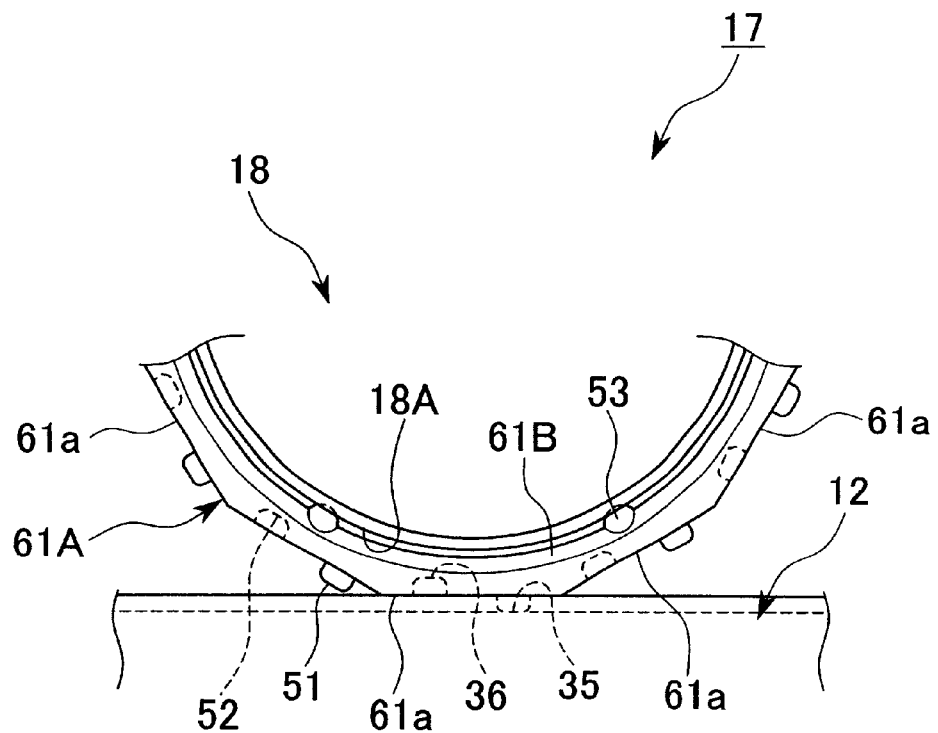
FIG. 8 is an enlarged sectional view showing a representative portion of the battery holder in FIG. 6.

FIG. 1 is a perspective view of a battery box 10 as an embodiment of the present invention. FIG. 2 is an exploded perspective view of the battery box 10 in FIG. 1. FIG. 3 is a sectional view of the battery box 10 in FIG. 1. FIG. 4 is a perspective view showing battery cells 18 held by a battery holder 17. FIG. 5 is a perspective view showing a grommet 61. FIG. 6 is an enlarged sectional view showing a representative portion of the battery box 10. FIG. 7 is a sectional view along line A—A in FIG. 6. FIG. 8 is an enlarged sectional view showing a representative portion of the battery holder 17.

The battery box 10 in the present embodiment may function as a battery device built into a vehicle such as a hybrid vehicle. The battery box 10 has a box shape which can be disassembled and consists of the upper portion 11, the lower portion 12, the front portion 13, the rear portion 14, the right portion 15, and the left portion 16, and also has the battery holder 17.

In the battery box 10, a plurality of battery cells 18, . . . , 18 are fixed in a manner such that the central axes of the cells are in parallel to each other and are perpendicular to the front-back direction of the battery box 10, where each battery cell typically has a cylindrical shape and a diameter of 32.4 mm. In addition, the battery cells 18, . . . , 18 are arranged in a manner such that the central axes of the battery cells 18, . . . , 18 (e.g., 20 cells) are arranged in a zig-zag matrix form, where the interval between the adjacent battery cells 18 and 18 may be 7 mm.

The battery box 10 may be made of a high-rigidity material (e.g., a composite material obtained by mixing 20% by weight of glass fiber into polyamide). As explained below, the internal space 21 of the battery box 10 functions as a passage through which cooling air passes, which is drawn from the front openings 22 provided in the front portion 13 and is discharged from the rear openings 23 provided in the rear portion 14. That is, while the cooling air drawn into the internal space 21 of the battery box 10 passes between the battery cells 18, . . . , 18, heat exchange is performed between the cooling air and the battery cells 18, . . . , 18, thereby cooling the battery cells.

The upper portion 11 and the lower portion 12 of the battery box have a similar shape such as a rectangular plate shape, and on each of the surfaces 11A and 12A of the upper and lower portions 11 and 12, a lattice-pattern reinforcing rib, which protrudes from the surface, is formed.

On each of the back faces 11B and 12B of the upper and lower portions 11 and 12 of the battery box (where the back faces function as inner surfaces of the battery box 10), a plurality of protruding flow control members (here, two members 32 and 33) are provided in a manner such that the flow control members are close to the rear portion 14 of the battery box 10 and extend in the right-left direction of the box.

As shown in FIG. 3, the first flow control member 32 and the second flow control member 33 respectively have slopes 32A and 33A, where each slope has a shape in which the height in the protruding direction gradually decreases in the direction from the rear to front side of the battery box 10. In addition, each of the slopes 32A and 33A has a curved surface arranged along the rear side of the outer-peripheral surface 18A of the corresponding battery cell 18, where a predetermined gap is provided between the slope and the outer-peripheral surface 18A.

More specifically, the first and second flow control members 32 and 33 are respectively assigned to the most rear battery cell 18 and the second battery cell 18 from the rear side among the battery cells 18, . . . , 18 in the vicinity of the upper portion 11 or the lower portion 12 of the battery box 10, in a manner such that a predetermined gap is provided between the outer-peripheral surface 18A of the relevant battery cell 18 and each of the slopes 32A and 33A.

In addition, the flow control member closer to the rear side (i.e., the first flow control member 32 in comparison with the second flow control member 33) is higher in the protruding direction (e.g., the highest portion of the first flow control member 32 has a height of 7.5 mm, while the highest portion of the second flow control member 33 has a height of 3.0 mm), so that the gap between the rear side of the outer-peripheral surface 18A of the battery cell 18 and the corresponding slope is narrower at the higher flow control member. Here, the minimum distance between the outer-peripheral surface 18A of the battery cell 18 and each of the back faces 11B and 12B of the upper and lower portions 11 and 12 of the battery box 10 is, for example, 3.5 mm, and the distance between the back faces 11B and 12B of the upper and lower portions 11 and 12 is, for example, 108 mm.

Here, the second flow control member 33 can change the flow direction of the cooling air, which passes in the vicinity of the upper portion 11 or the lower portion 12 of the battery box 10, from the direction along the inner surface 11B of the upper portion 11 or the inner surface 12B of the lower portion 12 to the direction towards the center in the corresponding vertical (i.e., upper-lower) direction. In particular, the battery cell 18C positioned at the center in the vicinity of the rear openings 23, or the like, can be efficiently cooled.

As shown in FIG. 2, the first flow control member 32 at the most rear side has a notch 32a which is provided at a specific position in the right-left direction so as to prevent interference with (the position of) the battery holder 17 (explained below).

As shown in FIG. 3, on each of the back faces 11B and 12B of the upper and lower portions 11 and 12 of the battery box 10, concave portions 35, . . . , 35 and convex portions 36, . . . , 36 are provided, where each concave portion 35 is detachably fitted into a corresponding convex portion 51 (explained below) of the battery holder 17 and each convex portion 36 is detachably fitted into a corresponding concave portion 52 (explained below) of the battery holder 17.

Each of the front portion 13 and the rear portion 14 of the battery box 10 typically has a rectangular plate shape and has a plurality of bolt through holes 41, . . . , 41 which face a plurality of bolt holes 135, . . . , 135 provided at a side of the upper portion 11 and a side of the lower portion 12. Accordingly, the upper and lower portions 11 and 12 can be detachably engaged with the front and rear portions 13 and 14 via fastening bolts 42 which are inserted into the corresponding bolt through holes 41 and are engaged with the corresponding bolt holes 135.

The front portion 13 has a plurality of front openings (here, three openings 22, 22, and 22) arranged in the right-left direction of the battery box 10.

On the back face 13B of the front portion 13, which functions as an inner surface of the battery box 10, a plurality of shielding members (here, three members 43, 44, and 45) are provided, where each shielding member extends in the right-left direction in a manner such that the shielding member bridges the front openings 22, 22, and 22. Here, the first shielding member 43 may be arranged so as to connect the protruding ends 46a, . . . , 46a of a plurality of protruding portions 46, . . . , 46 which protrude from the back face 13B of the front portion 13 towards the inner side of the battery box 10.

In addition that the first, second and third shielding members 43, 44, and 45 extend in the right-left direction, each shielding member has a plate shape which is bent towards the front side of the battery box 10 (see FIG. 3), that is, has a substantial V-shaped section.

Among the battery cells 18, . . . , 18 in the vicinity of the front openings 22, 22, and 22, the first shielding member 43 covers the front side of the outer-peripheral surface 18A of the battery cell 18 which is positioned approximately at the center in the vertical direction, and the second and third shielding members 44 and 45 respectively cover the outer-peripheral surfaces 18A and 18A of the battery cells 18 and 18 adjacent to the above center battery cell 18 in the vertical direction.

Additionally, in the vertical direction, the shielding member closer to the center position (i.e., the first shielding member 43 in comparison with the second and third shielding members 44 and 45) has a larger vertical width (e.g., the vertical width of the first shielding member 43 is 22 mm, and the vertical width of the second and third shielding members 44 and 45 is 16 mm). Accordingly, these shielding members prevent the cooling air, which is drawn from the front openings 22, 22, and 22 into the inner space 21 of the battery box 10, from directly blowing onto the outer-peripheral surface 18A of each battery cell 18.

The rear portion 14 of the battery box 10 has a plurality of rear openings (here, three openings 23, 23, and 23) which correspond to the front openings 22, 22, and 22 of the front portion 13. The rear portion 14 also has protruding portions 46 and 46, each positioned between the adjacent rear openings 23 and 23. The protruding portions 46 and 46 protrude from the back face 14B of the rear portion 14, which functions as an inner surface of the battery box 10, towards the inside of the battery box 10.

Among the protruding portions 46, . . . , 46 which protrude from the back face 13B of the front portion 13, the two protruding portions 46 and 46, each positioned between the adjacent front openings 22 and 22, have concave portions 47, ..., 47 and convex portions 48, ..., 48. Similarly, the two protruding portions 46 and 46, which protrude from the back face 14B of the rear portion 14 towards the inside of the battery box 10, have concave portions 47, ..., 47 and convex portions 48, ..., 48. Each concave portion 47 is detachably engaged with one of the convex portions 51 (explained below) of the battery holder 17 and each convex portion 48 is detachably engaged with one of the concave portions 52 (explained below) of the battery holder 17.

Each of the right portion 15 and the left portion 16 of the battery box 10 typically has a rectangular plate shape and is detachably fastened to the upper portion 11 and the lower portion 12 via bolts (not shown).

The right and left portions 15 and 16 hold the battery cells 18, ..., 18, which are contained in the inner space 21 of the battery box 10, in a manner such that these battery cells are placed between the right and left portions 15 and 16 in the direction parallel to the central axes of the cells and that the battery cells 18, ..., 18 are electrically connected in series. That is, each of the right and left portions 15 and 16 has a plurality of bus bars 49 made of electrically conductive materials, where each bus bar contacts the terminal electrodes of adjacent battery cells 18 and 18 so as to connect these cells in series and is connected to a different set of the battery cells 18 and 18.

In addition, each of the right and left portions 15 and 16 has concave portions into which the terminal portions, which protrude from the ends of the battery cells 18, ..., 18 in the central-axis direction, can be fit, and the terminal portion and the concave portion have shapes for preventing the battery cell 18 from rotating around the central axis when the terminal portion of the battery cell is fit into the concave portion.

As shown in FIG. 4, any number of battery cells 18, ..., 18 can be coupled with each other via the battery holder 17. As shown in FIG. 3, the battery holder 17, made of an electrically insulating material, has a plurality of ring-shaped grommets 61, ..., 61 and a plurality of coupling members 62, ..., 62 for coupling the grommets. The outer periphery of each grommet 61 has a regular dodecagon section shape while the inner periphery has a circular section shape, where the thickness in the radial direction may be 1.5 to 3 mm (typically, 2 mm), and the thickness in the central-axis direction may be 12.4 mm. Here, every two grommets 61 and 61, which are adjacent in the front-back direction of the battery box 10, are coupled using the coupling member 62.

As shown in FIGS. 5, 6, and 8, the grommet 61 has a polyhedral (here, dodecagon) outer-peripheral surface 61A consisting of a plurality of contact faces 61a, 61a (i.e., 12 contact faces in the case of the dodecagon outer-peripheral surface). The contact faces 61a, ..., 61a are arranged along the peripheral direction in a manner such that the plane of every contact face intersects the plane of the adjacent contact face with the same angle, and a pair of the convex portion 51 and the concave portion 52 (which may have a depth of 1.5 to 2 mm and an inner diameter of 2 to 4 mm) is provided on each contact face 61a.

The convex portion 51 which protrudes from each contact face 61a is positioned away from the center of the contact face 61a in the peripheral direction. The concave portion 52, which has a size suitable for fitting the convex portion 51 into the concave portion 52, is also positioned away from the center of the contact face 61a in the peripheral direction, but towards the direction opposite to that towards which the convex portion 51 is away from the center position.

As shown in FIG. 6 and the like, the adjacent grommets 61 and 61 contact each other via any contact faces 61a and 61a in the outer-peripheral surfaces 61A and 61A of the grommets, in a manner such that the convex portion 51 on each contact face 61a is detachably fit into the corresponding concave portion 52 on the other contact face 61a which faces the above contact face 61a.

When arranging grommets 61, ..., 61 in a manner such that a center grommet 16 having a dodecagonal outer-peripheral surface 61A is surrounded by similar grommets (refer to FIG. 3), every second contact face 61a along the peripheral direction of the center grommet (i.e., 6 contact faces 61a) contacts a contact face 61a of a different grommet 61.

Regarding the six grommets 61, ..., 61 which surround the center grommet 61, the adjacent grommets 61 and 61 also contact with each other via the contact faces 61a of both grommets.

Accordingly, in the internal space 21 of the battery box 10, the grommets 61, 61 are arranged in a manner such that the central axes of the grommets form a zig-zag matrix pattern in a section perpendicular to the right-left direction of the battery box 10.

As shown in FIG. 5 and the like, on the inner-peripheral surface 61B of the grommet 61, a plurality of protruding portions (here 6 portions) 53, ..., 53 are provided, where each protruding portion 53 expands in the right-left direction, and the outer-peripheral surface 18A of the battery cell 18, which is attached to the grommet 61, contacts the protruding portions 53, ..., 53. The height of the protruding portion 53 may be 0.65 mm.

As shown in FIGS. 5, 7, and the like, on the inner-peripheral surface 61B of the grommet 61, a diameter-enlarged portion 61BB is provided in the vicinity of at least one end (e.g., the end closer to the right portion 15 among two ends of the battery box 10 in the right-left direction), that is, the diameter of the portion 61BB is gradually enlarged towards the end. Additionally, in the vicinity of the relevant end, the height of each protruding portion 53 gradually decreases towards the end, so that the battery cell 18 can be easily inserted into the grommet 61.

The coupling member 62 is formed by connecting the ends of extensions 64 and 64 which extend from the contact faces 61a and 61a (which contact each other) of the adjacent grommets 61 and 61 towards the tangential direction with respect to the peripheral direction. Here, the angle formed by the extensions 64 and 64 can be suitably determined and changed with respect to the ends of the extensions, which function as the rotation center.

In the present embodiment, as shown in FIG. 2, a plurality of battery holders 17, ..., 17 (here, two holders) are provided for the plurality of battery cells 18, ..., 18 contained in the internal space 21 of the battery box 10.

The battery holders 17, ..., 17 may be positioned in regular intervals in the right-left direction of the battery box 10 or at any suitable positions.

When containing the battery cells 18, ..., 18 into the internal space 21 of the battery box 10, first, each battery cell 18 is inserted into the corresponding grommet 61, and in the next step, a plurality of adjacent grommets 61, ..., 61 are arranged in a manner such that the grommets contact each other via the relevant contact faces 61a of the grommets.

Accordingly, the pair of the convex portion 51 and the concave portion 52, provided on one of the contact faces 61a which contact each other are detachably fit to the corresponding pair of the concave portion 52 and the convex portion 51 provided to the other contact face 61a, thereby fastening the adjacent grommets 61, ..., 61.

The upper portion 11, the lower portion 12, the front portion 13, the rear portion 14, the right portion 15, and the left portion 16 are then assembled so as to surround and cover the grommets 61, ..., 61.

In this process, some of the convex portions 51, ..., 51 and the concave portions 52, ..., 52 of the grommets 61, ..., 61 are detachable fit to the corresponding concave portions (i.e., the corresponding concave portions 35, ..., 35 provided on the back faces 11B and 12B of the upper and lower portions 11 and 12, and the corresponding concave portions 47, ..., 47 provided in the front and rear portions 13 and 14) and the convex portions (i.e., the corresponding convex portions 36, ..., 36 provided on the back faces 11B and 12B of the upper and lower portions 11 and 12, and the corresponding convex portions 48, ..., 48 provided in the front and rear portions 13 and 14). Accordingly, the grommets 61, ..., 61 are fixed inside the internal space 21 of the battery box 10.

The battery box 10 of the present embodiment has the above-explained structure. Below, the operation of cooling the battery cells 18, ..., 18 contained in the internal space 21 will be explained.

The air in the interior of the vehicle is drawn as the cooling air via the front openings 22, 22, and 22 into the internal space 21, and flows between the battery cells 18, ..., 18 in the internal space 21 towards the rear side. In this flowing process, the cooling air in the internal space 21 performs heat exchange with the battery cells 18, ..., 18, so that the battery cells 18, ..., 18 are cooled and the cooling air is heated to have a slightly higher temperature. The cooling air is then discharged via the rear openings 23, 23, and 23 of the battery box 10 to the outside.

Here, the first to third shielding members 43, 44, and 45 are provided in a manner such that the shielding members cover the front sides of the outer-peripheral surfaces 18A of the battery cells 18, ..., 18 positioned in the vicinity of the front openings 22, 22, and 22, thereby suppressing the cooling air, drawn from the front openings 22, 22, and 22 into the internal space 21, from directly blowing onto the outer-peripheral surfaces 18A of these battery cells 18. Accordingly, it is possible to prevent (i) the battery cells 18, ..., 18 in the vicinity of the front openings 22, 22, and 22 from being excessively cooled, (ii) the temperature of the cooling air in the vicinity of the front openings 22, 22, and 22 from excessively increasing, and (iii) the cooling capability of the cooling air from being degraded at the rear side of the internal space 21.

In addition, each of the upper portion 11 and the lower portion 12 of the battery box 10 has the first and send flow control members 32 and 33, which respectively have slopes 32A and 33, in the vicinity of the rear openings 23, 23, and 23, where a predetermined gap is provided between each slope and the rear side of the outer-peripheral surface 18A of the corresponding battery cell 18 which faces the slope. Therefore, in comparison with the structure in which the flow control members 32 and 33 are omitted, the flow rate (or velocity) of the cooling air which flows along the outer-peripheral surface 18A of the relevant battery cell 18 increases, thereby improving the efficiency of cooling the battery cell 18.

Accordingly, it is possible to prevent the capability for cooling the battery cells 18, ..., 18 in the vicinity of the rear openings 23, 23, and 23 from being degraded, thereby suppressing nonuniformity in the temperature distribution between the battery cells 18, ..., 18 contained in the battery box 10.

As explained above, according to the battery holder 17 of the present embodiment. when the grommets 61, ..., 61 are coupled with each other, these grommets 61 can be easily arranged in a specific form only by contacting the contact faces 61a (which face each other) of the adjacent grommets 61, and the coupled grommets 61, ..., 61 can be easily fixed by detachably fitting the pair of the convex portion 51 and the concave portion 52 of one of the contact faces 61a, which contact each other, to the corresponding pair of the concave portion 52 and the convex portion 51 of the other contact face 61a.

According to the coupling member 62 for coupling the adjacent grommets 61 and 61, it is possible to easily make a contact face 61a of one of the grommets 61 contact a contact face 61a of the other grommet 61 simply by moving the extensions 64 and 64 like a hinge (i.e., opening to closing motion); thus, the specific positioning of the grommets 61, ..., 61 can be more easily performed.

In addition, the grommet 61 has protruding portions 53, ..., 53 on its inner-peripheral surface 61B. Therefore, a suitable space can be secured between the outer-peripheral surface 18A of the battery cell 18 and the inner-peripheral surface 61B of the grommet 61. Furthermore, the grommet 61 contacts the outer-peripheral surface 18A of the battery cell 18 via the oblong-shaped protruding portions 53, ..., 53; thus, the distance along which the grommet 61 contacts the outer-peripheral surface 18A of the battery cell 18 can be increased, thereby further improving the electrical insulation performance. Additionally, when the battery cell 18 is inserted into the grommet 61, the grommet 61 slightly deforms, so that the battery cell 18 can be easily attached to the grommet 61.

According to the battery box 10 of the present embodiment, the battery cells 18, ..., 18 can be arranged in a zig-zag matrix form by using the battery holders 17, so that the arrangement efficiency of the battery cells 18, ..., 18 in the internal space 21 can be improved and the battery box 10 can be smaller.

In such an arrangement, the arrangement density with respect to the battery cells 18, ..., 18 in the internal space 21 is relatively increased, and accordingly, even when the volume of the space through which the cooling air passes relatively decreases, the first to third shielding members 43, 44, and 45 in the vicinity of the front openings 22, 22, and 22 and the first and second flow control members 32 and 33 in the vicinity of the rear openings 23, 23, and 23 prevent nonuniformity in the temperature distribution, thereby improving the cooling efficiency.

In addition, some of the convex portions 51, ..., 51 and the concave portions 52, ..., 52 of the grommets 61, ..., 61 are detachably fit to the corresponding concave portions (i.e., the corresponding concave portions 35, ..., 35 of the upper and lower portions 11 and 12, and the corresponding concave portions 47, ..., 47 of the front and rear portions 13 and 14) and the corresponding convex portions (i.e., the corresponding convex portions 36, ..., 36 of the upper and lower portions 11 and 12, and the corresponding convex portions 48, ..., 48 of the front and rear portions 13 and 14). Therefore, the battery holders 17 can be easily fixed in the internal space 21.

In the present embodiment, each of the first to third shielding members 43, 44, and 45 has a plate shape which is bent towards the front side of the battery box 10 and has a substantial V-shaped section consisting of two lines, the directions of which intersect each other on a plane perpendicular to the right-left direction. However, the shape is not limited, for example, the section may have a suitably curved shape or include suitably convex and concave portions. That is, each shielding member should have a shape by which the flow direction of the cooling air, which is drawn from the front openings 22, 22, and 22 into the internal space 21 and is blown onto the outer-peripheral surfaces 18A of the relevant battery cells 18, can be changed to a suitable direction towards the rear side of the battery box 10.

Also in the present embodiment, the coupling member 62 functions as a hinge formed by coupling the ends of the extensions 64 and 64 which extend from the contact faces 61a and 61a (which contact each other) of the adjacent grommets 61 and 61. However, the coupling member 62 is not limited to this form and may have a form obtained by providing a through hole in each of the ends of the above extensions 64 and 64, and fastening the extensions 64 and 64 in a rotatable form by using a bolt inserted into the through holes. That is, the flow control member 62 should have a shape by which the extensions 64 and 64 are fastened rotatably with respect to the rotation center (i.e., the ends of the extensions).

Figure 9:
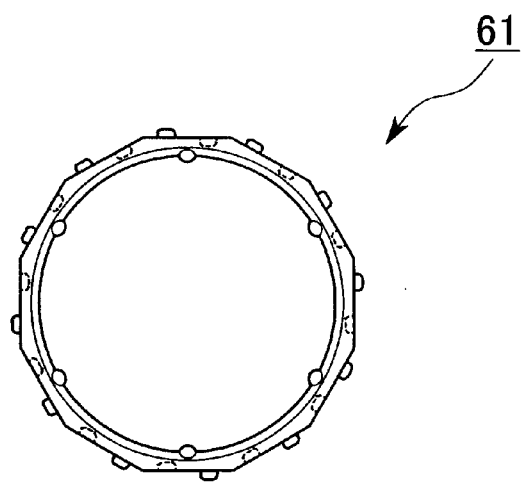
FIG. 9 is a sectional view showing a battery holder in the first variation of the embodiment.

Also in the present embodiment, the grommets 61, . . . , 61, which are adjacent each other in the front-back direction of the battery box 10, are coupled with each other via the coupling members 62, . . . , 62. However, the coupling form is not limited to this form. For example, as shown in FIG. 9 which shows the grommet 61 in the first variation of the present embodiment, the coupling member 62 may be omitted. In this case, the battery holder 17 has a plurality of grommets 61, . . . , 61 which can be detachably coupled with each other not via the coupling members 62.

Figure 10:
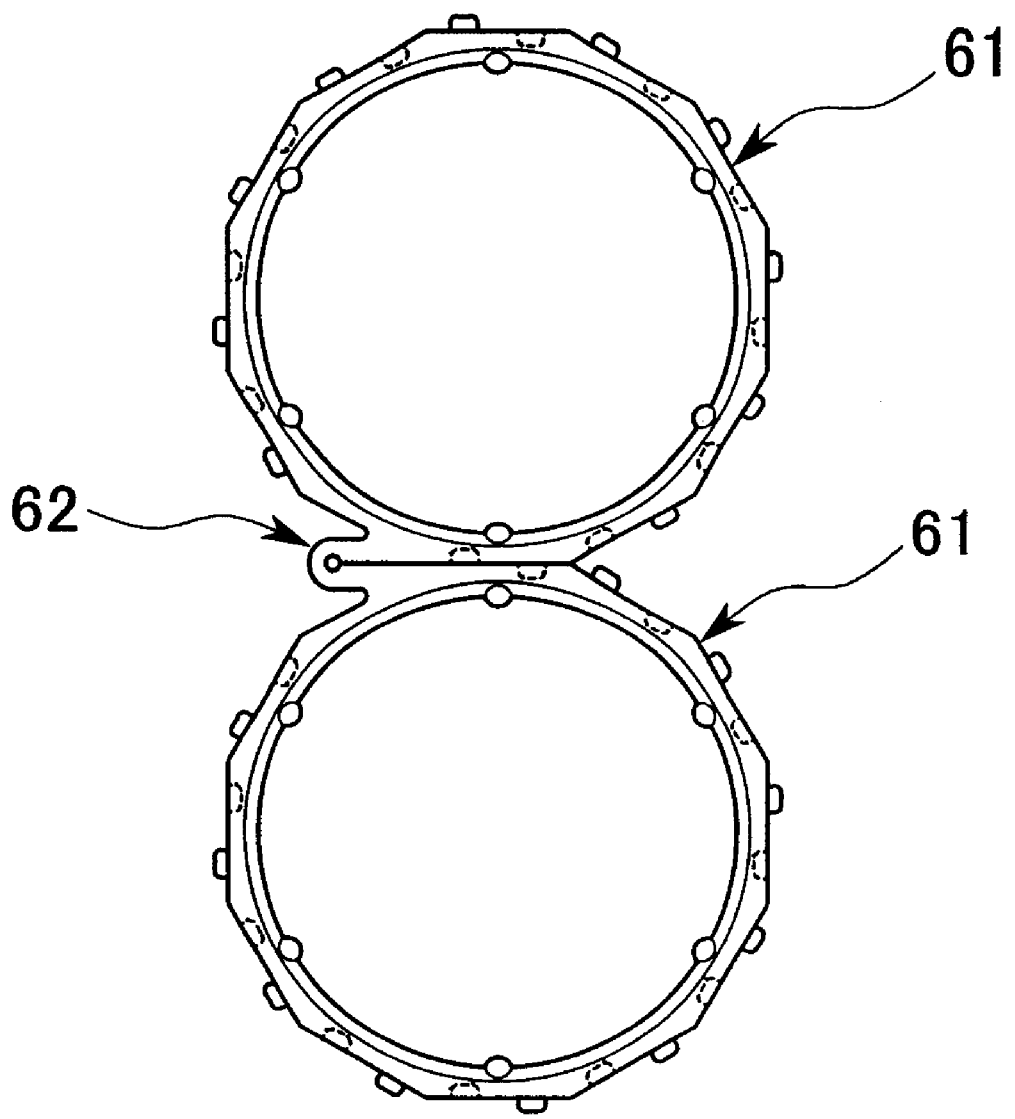
FIG. 10 is a sectional view showing a battery holder in the second variation of the embodiment.

When using the coupling member 62, the number of the grommets 61 which are coupled with each other via the coupling member 62 is a suitable number which is 2 or greater. For example, as shown in FIG. 10 which shows a pair of the grommets 61 and 61 in the second variation of the present embodiment, the battery holder 17 may have a plurality of the pairs of the grommets 61 and 61 which are coupled with each other via the coupling member 62, and the pairs may be detachably coupled with each other.

Figure 11:
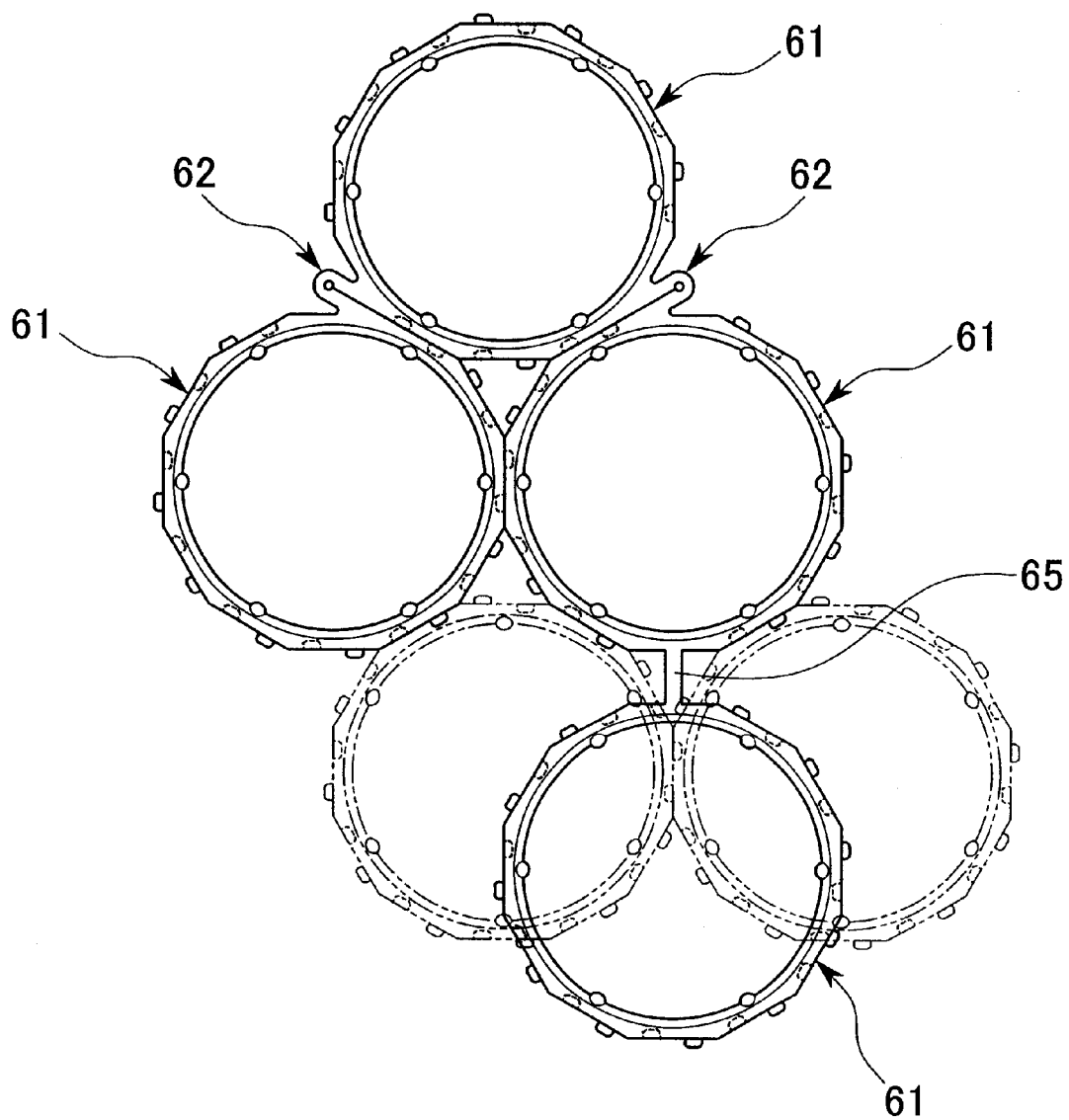
FIG. 11 is a sectional view showing a battery holder in the third variation of the embodiment.

Also in the present embodiment, the adjacent grommets 61 and 61 are coupled with each other via the coupling member 62 in a manner such that the contact faces 61a and 61a can contact each other. However, this is not a limiting condition. For example, as shown in FIG. 11 which shows the third variation of the present embodiment, a coupling member 65 may be provided for coupling adjacent grommets 61a and 61 which are arranged with a specific interval. In this case, a plurality of the battery cells 18, . . . , 18 can be arranged in the internal space in a suitable form which is not limited-to the zig-zag matrix form.

Also in the present embodiment, each of the contact faces 61a, . . . , 61a, which form the outer-peripheral surface 61A of the grommet 61, has a pair of the convex portion 51 and the concave portion 52. However, this is not a limiting condition and each contact face 61 a may have a plurality of the pairs of the convex portion 51 and the concave portion 52. As another example, a through hole may be provided in place of the concave portion 52.

In addition, the shapes of the convex portion 51 and the concave portion 52 are not specifically limited. The convex portion 51 may have any suitable shape such as a cylindrical or prismatic form. That is, the convex portion 51 and the concave portion 52 should have shapes by which the convex portion 51 can be detachably fit into the concave portion 52.

Also in the present embodiment, the outer-peripheral surface 61A of the grommet 61 has a dodecagonal shape. However, this is not a limiting condition, and the outer-peripheral surface 61A may have another polyhedral shape such as an octahedral shape. That is, one of the outer-peripheral surfaces 61A and 61A of adjacent grommets 61 and 61 should include a contact face 61a which can be made to contact a contact face 61a of the other outer-peripheral surface 61A.

Also in the present embodiment, the grommet 61 has a ring shape. However, the shape is not limited to a ring. For example, the grommet may have a ribbon shape whose both ends can be detachably connected. In this case, the ribbon-shaped member is wound around the battery cell 18, that is, on the outer-peripheral surface 18A of the battery cell 18 in the peripheral direction, and then the ends of the ribbon-shaped member are connected so as to produce a ring form.

Also in the present embodiment, a positioning member may be added to the grommet 61, so as to perform positioning of the grommet 61 with respect to the rotation direction around the central axis of the battery cell 18, or to the direction along the central axis of the battery cell 18.

Figure 12:
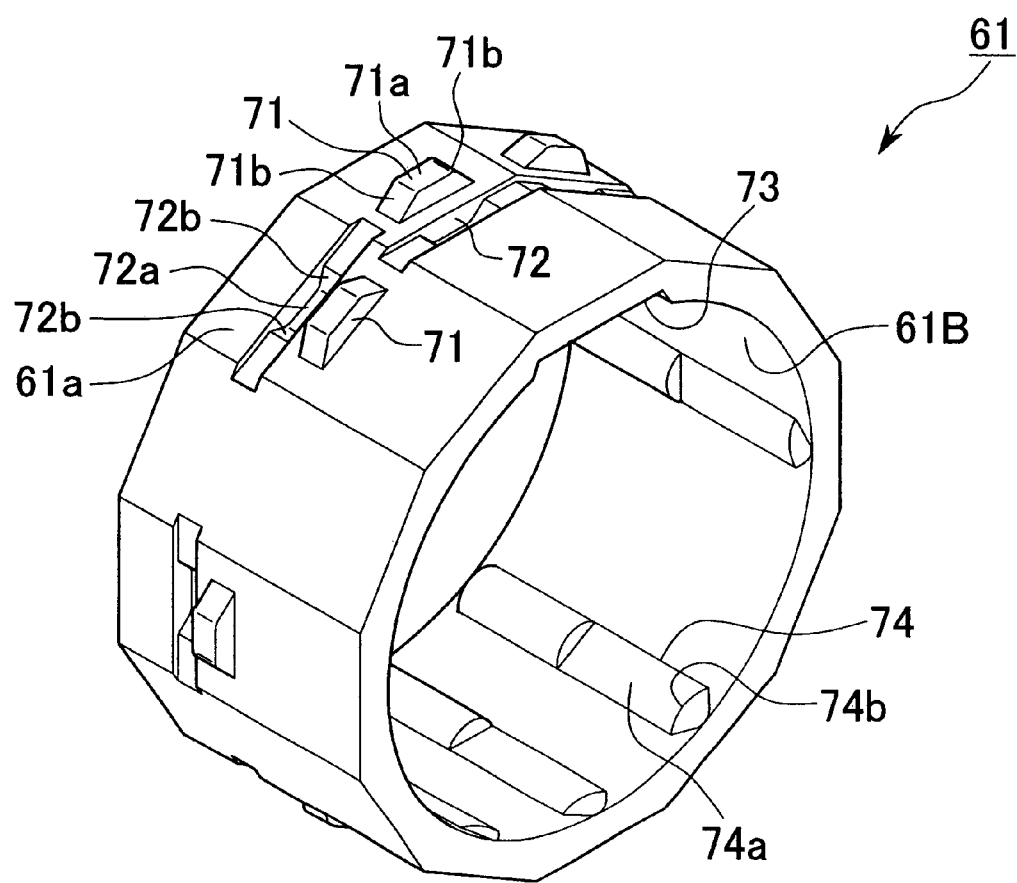
FIG. 12 is a perspective view showing a battery holder in the fourth variation of the embodiment.
Figure 14:
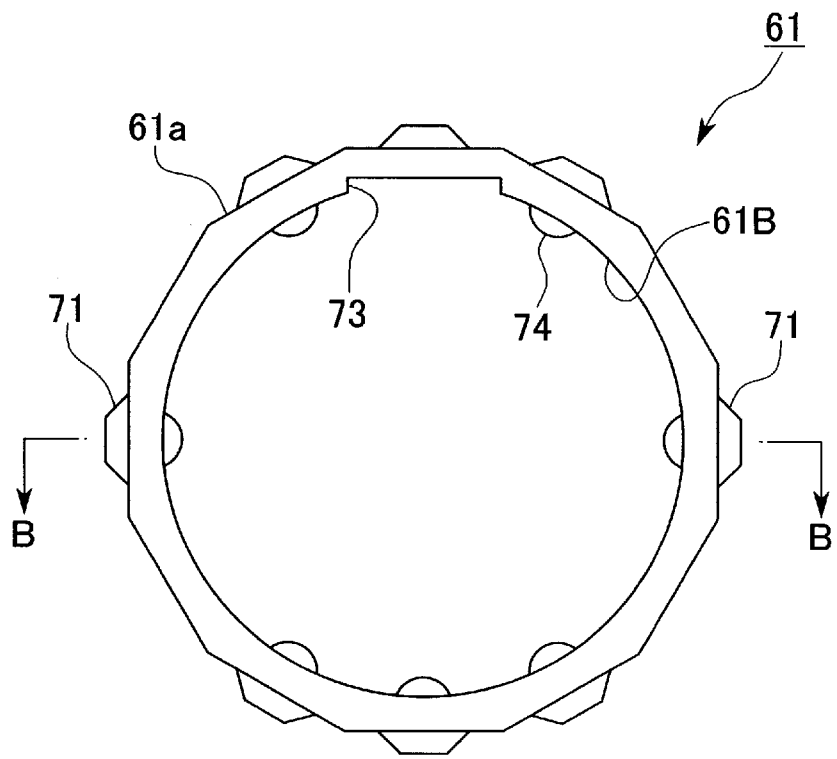
FIG. 14 is a sectional view showing the battery holder in FIG. 12.
Figure 15:
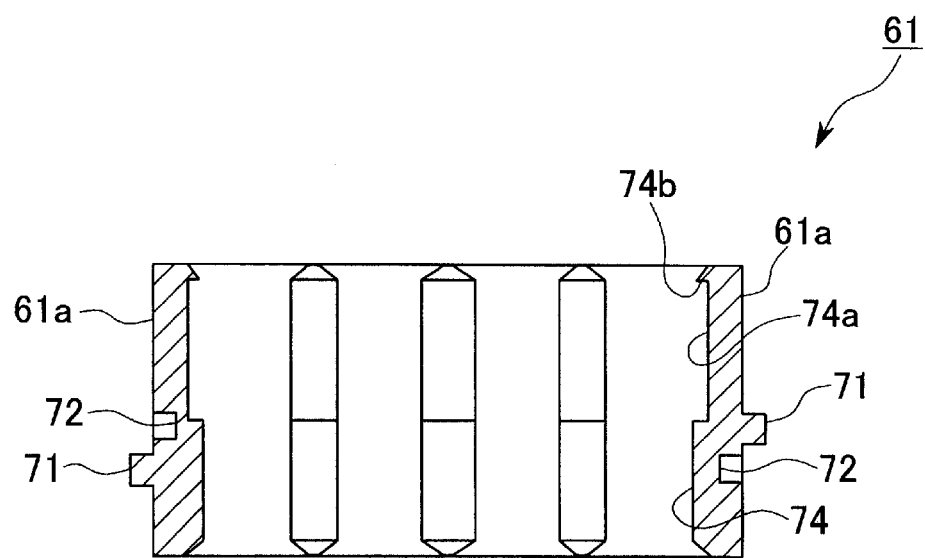
FIG. 15 is a sectional view along line B-B in FIG. 14.

For example, the grommet 61 in the fourth variation of the present embodiment (see FIGS. 12, 14, and 15) has a pair of the fitting convex portion 71 and the fitting concave portion 72 on each contact face 61a which is made to contact a contact face 61a of the adjacent grommet 61. Here, any one of the fitting convex portion 71 and the fitting concave portion 72 (which has a shape into which the convex portion 71 can be detachably fit) is formed at a position away from the center position of the contact face 61a in the direction parallel to the central axis (see FIG. 12).

Among a plurality of the pairs of the fitting convex portion 71 and the fitting concave portion 72 in the peripheral direction of the grommet 61 (e.g., 8 pairs), a first half of the pairs (e.g., 4 pairs) which are adjacent to each other and the second (i.e., remaining) half of the pairs (e.g., 4 pairs) which are also adjacent to each other have different arrangements with respect to the fitting convex portion 71 and the fitting concave portion 72, that is, the positioning relationships between the fitting convex portion 71 and the fitting concave portion 72, which are positioned away form the center position of the contact face 61a in the direction parallel to the central axis, are inverted between the first and second halves.

The fitting convex portion 71 has slopes 71b and 71b, where the height of each slope is gradually decreased from the end face 71a (i.e., the end face in the protruding direction) to each end of the convex portion 71 in the peripheral direction. The fitting concave portion 72 has slopes 72b and 72b, where the depth of each slope is gradually decreased from the bottom face 72a of the concave portion 72 to each end of the concave portion 72 in the peripheral direction.

Accordingly, in grommets 61 and 61 which are coupled by making contact the contact faces 61a and 61a of these grommets and fitting the fitting convex portion 71 and the fitting concave portion 72 provided on one of the contact faces 61a and 61a to the fitting convex portion 71 and the fitting concave portion 72 provided on the other contact face 61a, when at least one of the grommets 61 and 61 is relatively rotated with respect to the other grommet around the central axis, the engagement between the fitting convex portion 71 and the fitting concave portion 72 is released and thus the adjacent grommets 61 and 61 are separated.

Figure 13:
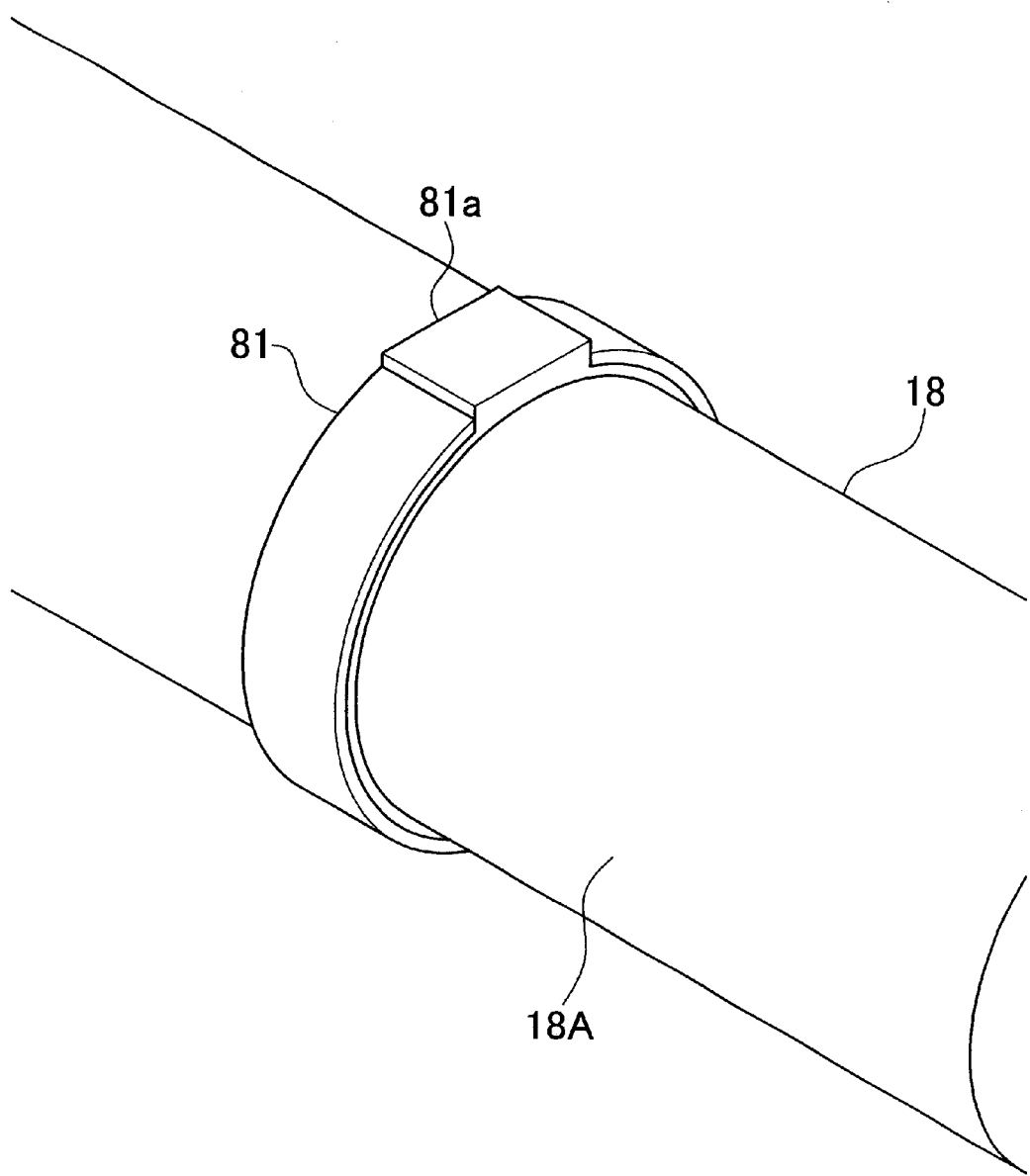
FIG. 13 is a perspective view showing a positioning member in the fourth variation of the embodiment.

On the inner-peripheral surface 61B of the grommet 61, a positioning concave portion 73 is provided, which extends in a direction parallel to the central axis. In addition, as shown in FIG. 13, on the outer-peripheral surface 18A of the battery cell 18, a ring-shaped positioning member 81 is attached, which has a positioning convex portion 81a which can be fit into the positioning concave portion 73 provided in the grommet 61. When the battery cell 18 is inserted into the grommet 61 and the positioning between the battery cell 18 and the grommet 61 with respect to the rotation direction around the central axis is performed, the positioning convex portion 81a of the positioning member 81 can be fit in the positioning concave portion 73 of the grommet 61 after sliding the positioning convex portion 81a in the concave portion 73 along a direction parallel to the central axis.

Accordingly, it is possible to prevent inaccurate positioning between the battery cell 18 and the grommet 61 with respect to the rotation direction around the central axis. Therefore, if a temperature sensor or the like is attached to the battery cell 18, it is possible to prevent the wiring for the temperature sensor from being complicated. Additionally, even when a terminal portion of the battery cell 18 is rotated around the central axis so as to screw and fit the terminal portion to a bus bar or the like, it is possible to prevent the battery cell 18 itself from being rotated around the central axis.

In this case, the right and left portions 15 and 16 of the battery box 10 can omit concave portions, into which terminal portions, protruding from the ends (in the central-axis direction) of the battery cell 18, are fit and which are provided for preventing the battery cell 18 from rotating around the central axis. In addition, the grommet 61 and the positioning member 81 may be provided in the vicinity of an end of the battery cell 18.

On the inner-peripheral surface 61B of the grommet 61 of the present variation, a plurality of protruding portions 74, . . . , 74 are provided, which are suitably positioned in the peripheral direction and which extend in the direction parallel to the central axis, where the outer-peripheral surface 18A of the battery cell 18 contacts the protruding portions 74, . . . , 74. Each protruding portion 74 has a notch 74a into which the positioning member 81 can be fit, where the positioning member 81 is attached to and protrudes from the outer-peripheral surface 18A of the battery cell 18.

Accordingly, when the battery cell 18 is inserted into the grommet 61, first, the battery cell 18 is moved along the central axis while the outer-peripheral surface 18A of the battery cell 18 contacts each protruding portion 74, and the positioning member 81, which protrudes from the outer-peripheral surface 18A of the battery cell 18, is then made to contact the end 74b of each protruding portion 74. When the battery cell 18 is further inserted into the grommet 61, the positioning member 81 moves in a manner such that the member 81 gets over the end 74b of each protruding portion 74, so that the positioning member 81 is fit into the notch 74a. Accordingly, it is possible to prevent an error in positioning between the battery cell 18 and the grommet 61 in the direction along the central axis of the battery cell 18. Therefore, each battery cell 18 can be easily attached to the battery box 10 and it is possible to prevent impact from the vehicle body or the like from acting on only the terminal portion of each battery cell 18.

Below, results of the test for cooling the battery cells 18, . . . , 18 contained in the battery box 10 of the present embodiment will be explained with reference to the drawings.

Figure 16:
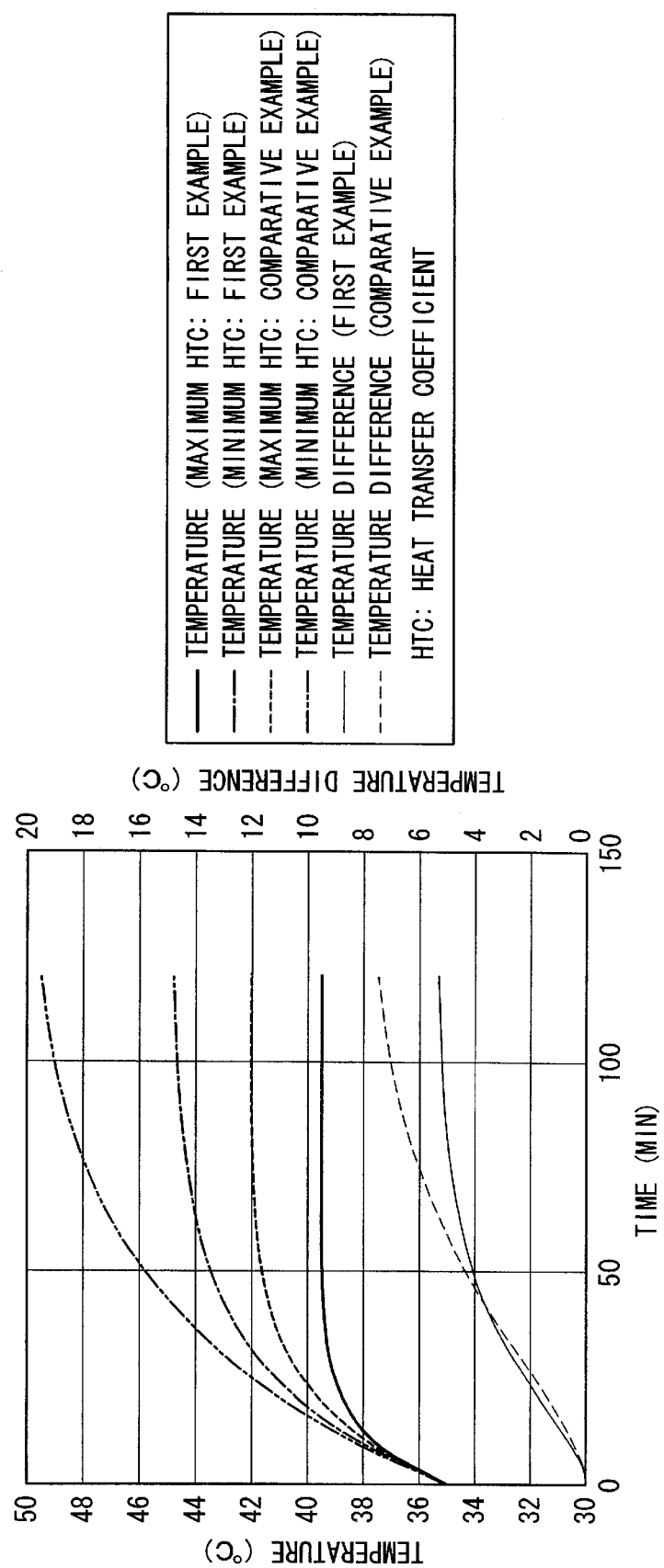
FIG. 16 is a graph showing temporal changes in the temperature and the temperature differences with respect to battery cells which are contained in the battery box in the first example and the comparative example of the embodiment and which generate heat.
Figure 17:
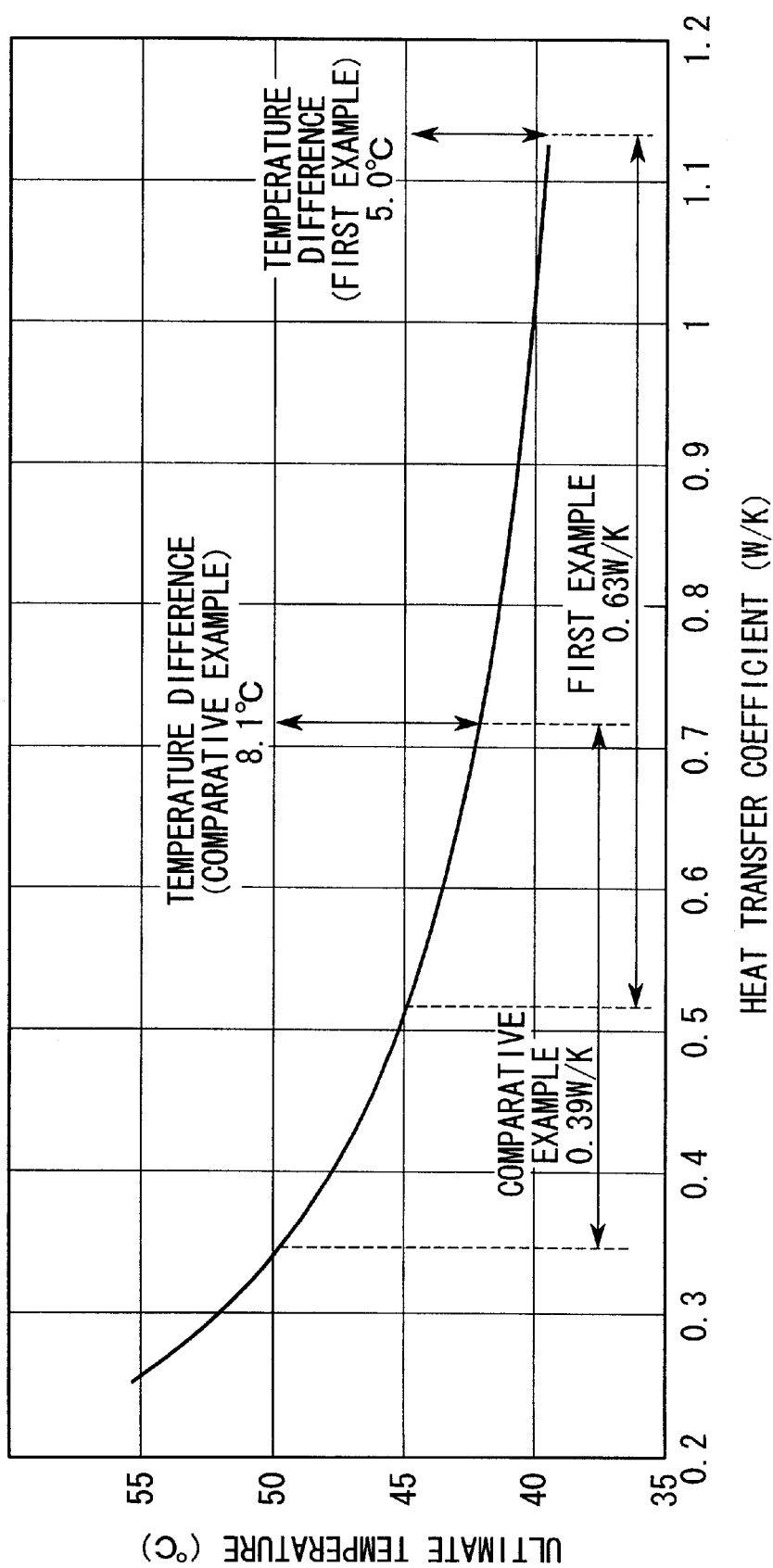
FIG. 17 is a graph showing temporal changes in the ultimate temperature according to the heat transfer coefficient, with respect to battery cells which are contained in the battery box in the first example and the comparative example of the embodiment and which generate heat.
Figure 18:
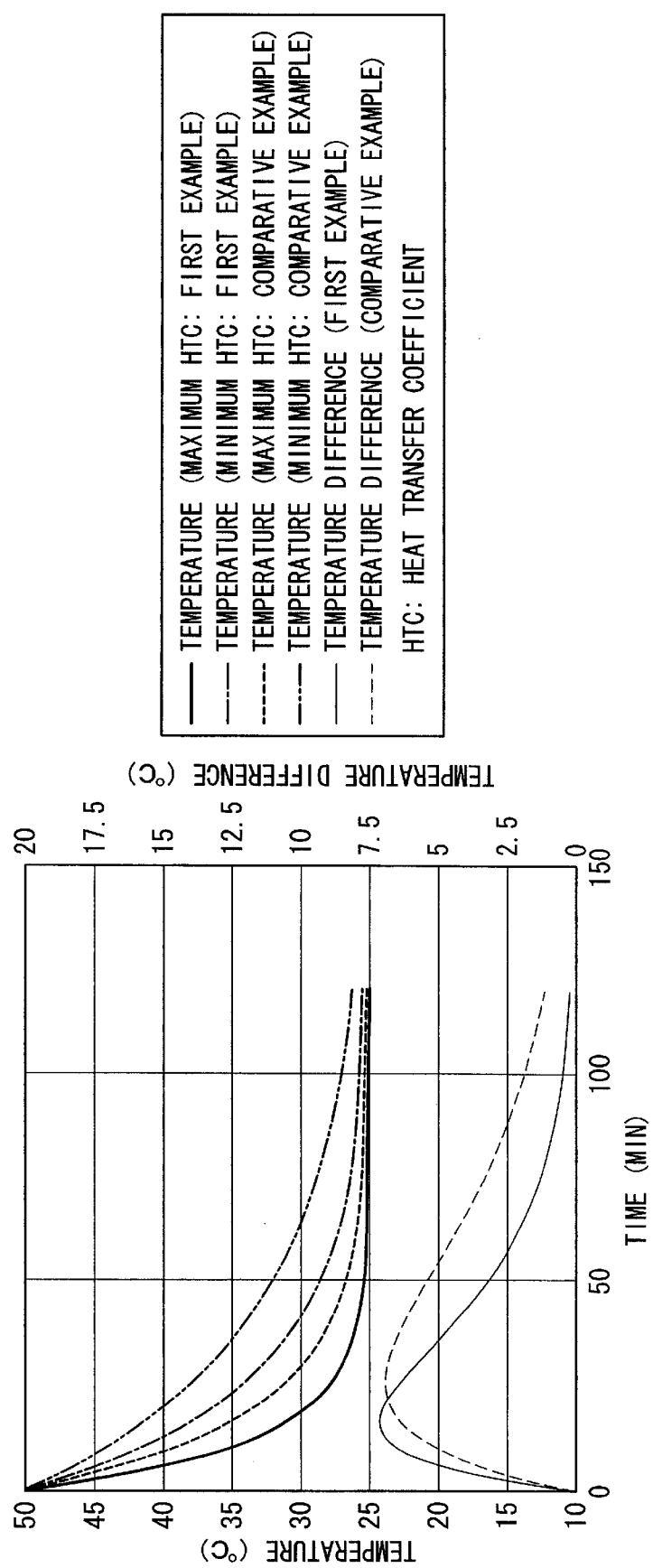
FIG. 18 is a graph showing temporal changes in the temperature and the temperature differences after stopping the heat generation of the battery cells which are contained in the battery box in the first example and the comparative example of the embodiment.

FIG. 16 is a graph showing temporal changes in the temperature and the temperature differences with respect to battery cells which are contained in the battery box in the first example and the comparative example of the present embodiment and which generate heat. FIG. 17 is a graph showing temporal changes in the ultimate temperature according to the heat transfer coefficient, with respect to battery cells which are contained in the battery box in the first example and the comparative example and which generate heat. FIG. 18 is a graph showing temporal changes in the temperature and the temperature differences after stopping the heat generation of the battery cells which are contained in the battery box in the first example and the comparative example.

Figure 19:
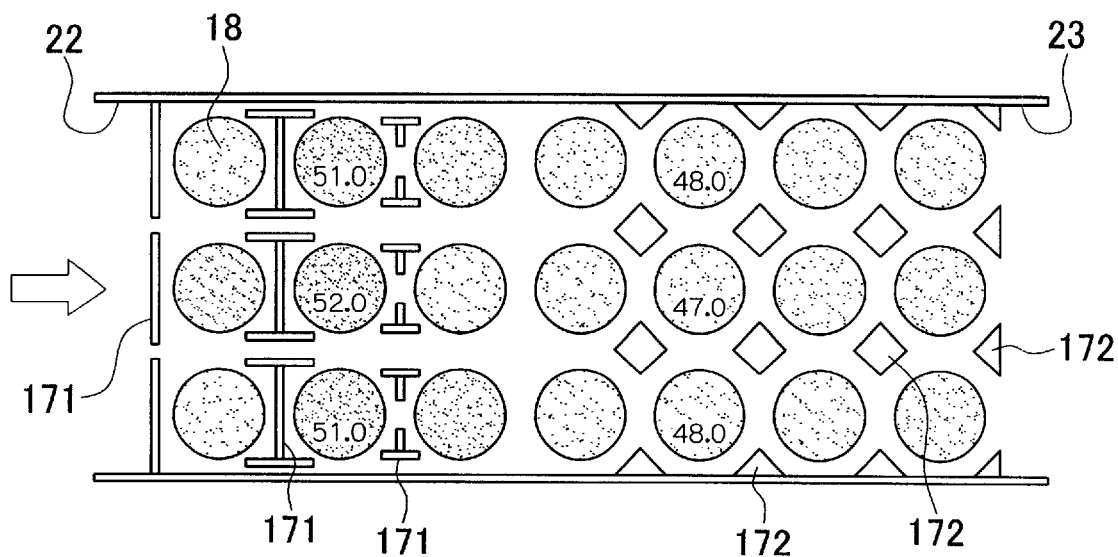
FIG. 19 is a diagram showing the ultimate temperature of each of the battery cells which are contained in the battery box of the comparative example for the embodiment and which generate heat.
Figure 20:
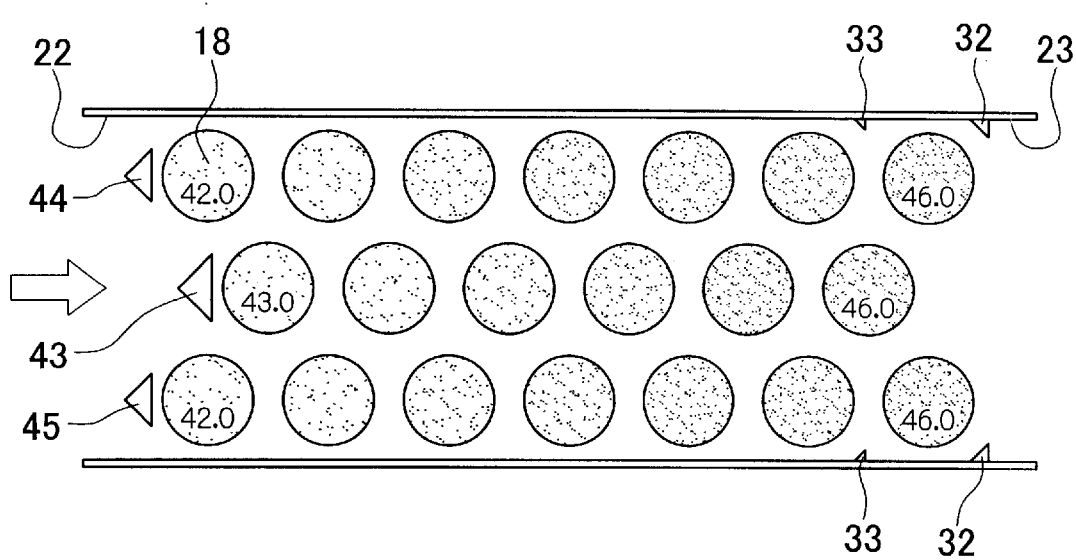
FIG. 20 is a diagram showing the ultimate temperature of each of the battery cells which are contained in the battery box of the first example of the embodiment and which generate heat.
Figure 21:
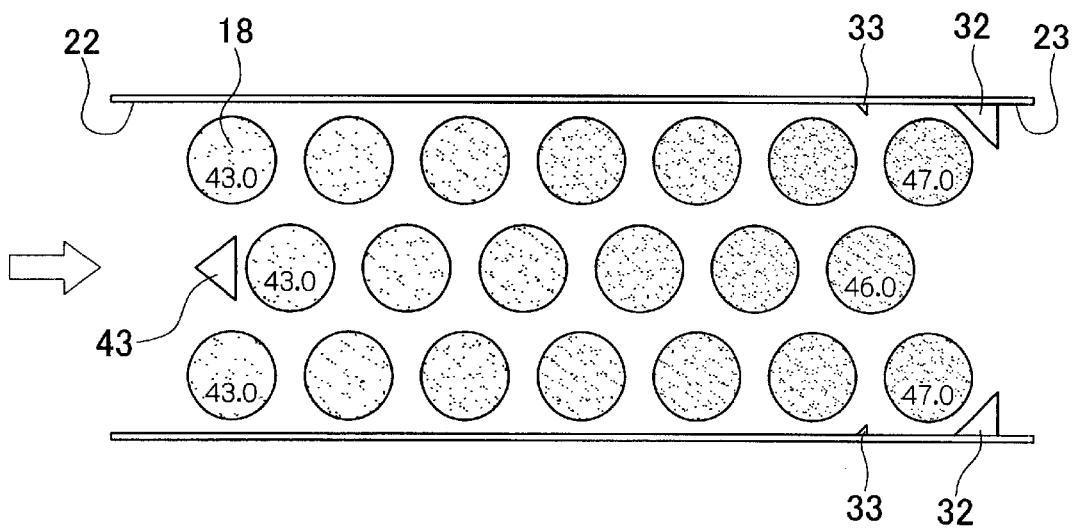
FIG. 21 is a diagram showing the ultimate temperature of each of the battery cells which are contained in the battery box of the second example of the embodiment and which generate heat.
Figure 22:
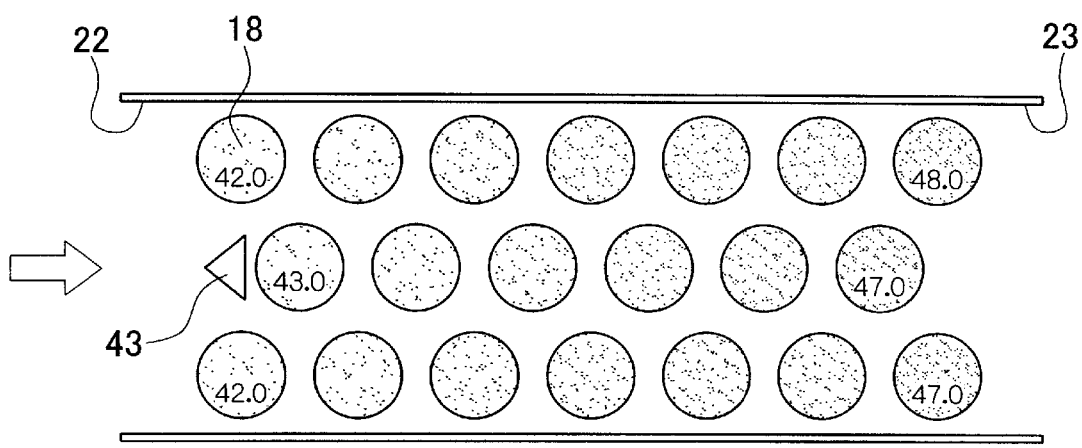
FIG. 22 is a diagram showing the ultimate temperature of each of the battery cells which are contained in the battery box of the third example of the embodiment and which generate heat.
Figure 23:
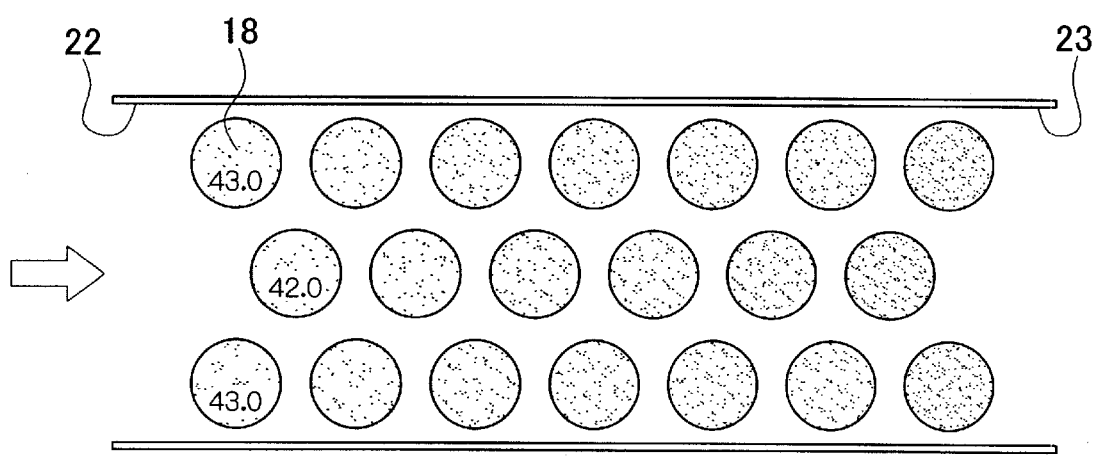
FIG. 23 is a diagram showing the ultimate temperature of each of the battery cells which are contained in the battery box of the fourth example of the embodiment and which generate heat.

FIG. 19 is a diagram showing the ultimate temperature of each of the battery cells which are contained in the battery box of the comparative example for the present embodiment and which generate heat. FIG. 20 is a diagram showing the ultimate temperature of each of the battery cells 18, . . . , 18 which are contained in the battery box 10 of the first example of the present embodiment and which generate heat. FIG. 21 is a diagram showing the ultimate temperature of each of the battery cells 18, . . . , 18 which are contained in the battery box 10 of the second example of the present embodiment and which generate heat. FIG. 22 is a diagram showing the ultimate temperature of each of the battery cells 18, . . . , 18 which are contained in the battery box 10 of the third example of the present embodiment and which generate heat. FIG. 23 is a diagram showing the ultimate temperature of each of the battery cells 18, . . . , 18 which are contained in the battery box 10 of the fourth example of the present embodiment and which generate heat.

The arrow in each of FIGS. 19 to 23 indicates the flow direction of the cooling air drawn into the battery box.

As shown in FIG. 19, in the battery box of the comparative example for the present embodiment, a plurality of battery cells 18, . . . , 18 (e.g., 21 battery cells) are arranged in a manner such that the central axes of the battery cells are arranged in a regular matrix form in a section perpendicular to the right-left direction of the battery box. Also in the battery box, plate-shaped shielding members 171, . . . , 171 are provided between the battery cells 18, . . . , 18 in the vicinity of the front openings 22 so as to partition the battery cells, and flow control members 172, . . . , 172 are provided between the battery cells 18, . . . , 18 in the vicinity of the rear openings 23 so as to narrow the flow passage between the adjacent battery cells 18 and 18.

As shown in FIG. 20, in the battery box 10 of the first example of the present embodiment, a plurality of battery cells 18, . . . , 18 (e.g., 20 battery cells) are arranged in a zig-zag matrix form in a section perpendicular to the right-left direction of the battery box. Also in the battery box 10, the first to third shielding members 43, 44, and 45 are provided for the battery cells 18, . . . , 18 in the vicinity of the front openings 22 so as to cover the front side of the outer-peripheral surface 18A of each battery cell, and the first and second flow control members 32 and 33 are provided along the rear side of the outer-peripheral surface 18A of each of the battery cells 18, . . . , 18 in the vicinity of the rear openings 23, where a specific gap is secured between the flow control member and the outer-peripheral surface 18A of the corresponding battery cell 18.

As shown in FIG. 21, the battery box 10 of the second example of the present embodiment has a structure in which the second and third shielding members 44 and 45 provided in the battery box 10 of the first example are omitted, and that the height of the first flow control member 32 in the protruding direction is higher than that in the first example.

As shown in FIG. 22, the battery box 10 of the third example of the present embodiment has a structure in which the first and second flow control members 32 and 33, which are provided in the battery box 10 of the second example, are omitted.

As shown in FIG. 23, the battery box 10 of the fourth example of the present embodiment has a structure in which the first shielding member 43, which is provided in the battery box 10 of the third example, is omitted.

The first test was a simulation for cooling the battery cells 18, . . . , 18 by using the cooling air, which were contained in a battery box (related to the present embodiment) built in a running vehicle and which were in a state of heat generation. The results of the simulation will be explained below.

Here, the average power of the battery cells 18, . . . , 18 due to the heat generation was 100 W, the voltage for driving the fan (not shown) provided for supplying the cooling air into the battery box was 12V, the flow rate of the cooling air was 60 m$^3$/hour, and the pressure loss in the cooling air in the battery box was 43 Pa.

For the battery boxes in the first and comparative examples, (i) temporal changes in the temperature of the battery cells 18 with respect to the specific maximum and minimum heat transfer coefficients, and (ii) temporal changes in the temperature difference between the temperature of the battery cells 18 with respect to the maximum heat transfer coefficient and the temperature of the battery cells 18 with respect to the minimum heat transfer coefficient, were measured.

According to the results of the simulation (see FIG. 16), in the comparative example, the temperature of the battery cells 18 at the minimum heat transfer coefficient was approximately 50° C. and the temperature of the battery cells 18 at the maximum heat transfer coefficient was approximately 42° C. In contrast, in the first example, the temperature of the battery cells 18 at the minimum heat transfer coefficient was approximately 45° C. and the temperature of the battery cells 18 at the maximum heat transfer coefficient was approximately 40° C. Therefore, it is possible to determine that the battery cells 18 in the first example were more efficiently cooled in comparison with the comparative example.

In addition, the temperature difference in the comparative example was approximately 8° C. (i.e., 50−42) while the temperature difference in the first example was approximately 5° C. (i.e., 45−40). Therefore, it is possible to determine that the temperature distribution was more uniform in the first example in comparison with the comparative example and that the first example had a superior cooling capability in comparison with the comparative example.

The second test was another simulation for cooling the battery cells 18, . . . , 18 by using the cooling air, which were contained in a battery box (related to the present embodiment) built in a running vehicle and which were in a state of heat generation. The results of the simulation will be explained below.

Here, the average power of the battery cells 18, . . . , 18 due to the heat generation was 100 W, the voltage for driving the fan (not shown) provided for supplying the cooling air into the battery box was 12V, and the flow rate of the cooling air was 60 m$^3$/hour. Under these conditions, changes in the ultimate temperature of the battery cells 18 versus the changes in the heat transfer coefficient were measured.

According to the results of the simulation (see FIG. 17), in the comparative example, the maximum value of the heat transfer coefficient was 0.725 W/K, the minimum value of the heat transfer coefficient was 0.337 W/K, the difference between the heat transfer coefficients was approximately 0.39 (≈0.725−0.337), and the difference between the ultimate temperatures was approximately 8.1° C. In contrast, in the first example, the maximum value of the heat transfer coefficient was 1.147 W/K, the minimum value of the heat transfer coefficient was 0.520 W/K, the difference between the heat transfer coefficients was approximately 0.63 (≈1.147−0.520), and the difference between the ultimate temperatures was approximately 5.0° C. Therefore, in comparison with the comparative example, the first example obtained superior uniformity in the temperature distribution and thus the cooling capability could be improved.

The third test was a simulation for cooling the battery cells 18, . . . , 18 by using the cooling air, where the heating of the battery cells 18 was stopped but still had a high temperature (50° C.).

Here, the voltage for driving the fan (not shown) provided for supplying the cooling air into the battery box was 12V, and the flow rate of the cooling air was 60 m$^3$/hour. Under these conditions, for the battery boxes in the first and comparative examples, (i) temporal changes in the temperature of the battery cells 18 with respect to the specific maximum and minimum heat transfer coefficients, and (ii) temporal changes in the temperature difference between the temperature of the battery cells 18 with respect to the maximum heat transfer coefficient and the temperature of the battery cells 18 with respect to the minimum heat transfer coefficient, were measured.

According to the results of the simulation (see FIG. 18), in comparison with the comparative example, the battery cells 18 were more quickly cooled and thus the cooling capability was improved in the first example. Also in comparison with the comparative example, the first example obtained superior uniformity in the temperature distribution measured after a specific elapsed time, and thus the cooling capability was improved.

The fourth test was another simulation for cooling the battery cells 18, . . . , 18 by using the cooling air, which were in a state of heat generation. The results of the simulation will be explained below.

Here, the average power of the battery cells 18, . . . , 18 due to the heat generation was 100 W, the voltage for driving the fan (not shown) provided for supplying the cooling air into the battery box was 12V, the flow rate of the cooling air was 60 m$^3$/hour, and the temperature of the supplied cooling air was 35° C. Under these conditions, the temperature distribution between the battery cells 18, . . . , 18 was measured for each of the comparative example and the first to fourth examples.

As shown in FIG. 19, in the comparative example, the plate-shaped shielding members 171, . . . , 171 were provided for the battery cells 18, . . . , 18 in the vicinity of the front openings 22, so as to prevent the cooling air from directly blowing onto the battery cells; thus, the temperatures of these battery cells 18, . . . , 18 were relatively very high (e.g., 52.0° C.). In addition, the flow control members 172, . . . , 172 for increasing the flow rate of the cooling air were provided for the battery cells 18, . . . , 18 in the vicinity of the rear openings 23; thus, the temperatures of these battery cells 18, . . . , 18 were relatively very low (e.g., 47.0° C.). Therefore, the temperature difference was 5.0° C. (=52.0−47.0), and the pressure loss of the cooling air was 53.1 Pa.

In contrast, as shown in FIG. 20, in the battery box 10 of the first example of the present embodiment (see FIG. 20), the temperatures of the battery cells 18, . . . , 18 in the vicinity of the front openings 22, 22, and 22 were 42.0 to 43.0° C., and the temperatures of the battery cells 18, . . . , 18 in the vicinity of the rear openings 23, 23, and 23 were 46.0° C. Therefore, it is possible to determine that the battery cells could be more efficiently cooled in the first example, in comparison with the comparative example. That is, according to the first example, it is possible to prevent the battery cells 18, . . . , 18 in the vicinity of the front openings 22 from being covered in a manner such that the battery cells have excessively high temperatures, or to prevent the battery cells 18, . . . , 18 in the vicinity of the rear openings 23 from being excessively cooled.

In addition, in the battery box of the first example, the temperature difference was approximately 4.0° C. (=46.0–42.0); thus, in comparison with the comparative example, the uniformity in the temperature distribution could be further improved, thereby further improving the cooling capability.

Also in the battery box of the first example, the pressure loss of the cooling air was 50.1 Pa. Therefore, in comparison with the comparative example, the battery cells could be more efficiently cooled.

On the other hand, in the battery box of the second example (see FIG. 21), the pressure loss of the cooling air was 53.7 Pa which was substantially the same as that of the comparative example. However, the temperatures of the battery cells 18, ..., 18 in the vicinity of the front openings 22 were 43.0° C. and the temperatures of the battery cells 18, ..., 18 in the vicinity of the rear openings 23 were 46.0 to 47.0° C. Therefore, in comparison with the comparative example, the battery cells 18, ..., 18 could be more efficiently cooled. In addition, the temperature difference was approximately 4.0° C. (=47.0–43.0); thus, in comparison with the comparative example, the uniformity in the temperature distribution could be further improved, thereby further improving the cooling capability.

As shown in FIG. 22, in the battery box of the third example of the present embodiment, the first shielding member 43 was provided; thus, the temperatures of the battery cells 18, ..., 18 in the vicinity of the front openings 22 were 42.0 to 43.0° C. Therefore, in the third example, it was possible to prevent the cooling air from directly blowing onto the battery cells 18 and having an excessively high temperature; thus, in comparison with the comparative example, more suitable cooling operation could be performed.

As shown in FIG. 23, in the battery box of the fourth example of the present embodiment, the battery cells 18, ..., 18 were arranged in a zig-zag matrix form, so that the temperatures of the battery cells 18, ..., 18 in the vicinity of the front openings 22 were 42.0 to 43.0° C. Therefore, in comparison with the comparative example, the cooling capability could be improved.

What is claimed is:

1. A battery box comprising:
 a container formed by connecting an upper portion, a lower portion, a front portion, a rear portion, and two side portions, where the container can be disassembled and the front portion has a coolant supply opening from which a coolant is drawn into the container, and the rear portion has a coolant discharge opening from which the coolant is discharged from the container;
 a battery holder having a plurality of cell holding members for holding a plurality of cells in the container, wherein the cell holding members are detachably connected to each other in a manner such that central axes of the cells held by the cell holding members are parallel to a direction along which the two side portions face each other and that the cells are arranged in a zig-zag matrix form in a section perpendicular to the central axes of the cells;
 a shielding member, provided in the vicinity of the coolant supply opening, for changing the flow direction of the coolant which is drawn from the coolant supply opening into the container, and for preventing the coolant from directly blowing onto at least one of the cells in the vicinity of the coolant supply opening; and
 a flow control member, provided in the vicinity of the coolant discharge opening, for changing the flow direction of the coolant in a manner such that the coolant flows towards the rear side of at least one of the cells in the vicinity of the coolant discharge opening.

2. A battery box as claimed in claim 1, wherein each of the front and rear portions has a support portion for supporting the battery holder.

3. A battery box as claimed in claim 1, wherein:
 each cell holding member of the battery holder has at least a pair of a convex portion and a concave portion which are provided on an outer surface of the cell holding member; and
 the cell holding members are detachably connected to each other by fitting the convex portion of one cell holding member into the concave portion of another cell holding member.

4. A battery holder comprising a plurality of cell holding members for holding a plurality of cells, wherein:
 the cell holding members are detachably connected to each other in a manner such that central axes of the cells held by the cell holding members are parallel to a direction along which the two side portions face each other and that the cells are arranged in a zig-zag matrix form in a section perpendicular to the central axes of the cells; and
 each cell holding member has a ring-shaped member into which one of the cells is insertable, wherein the ring-shaped member has a contact face on an outer-peripheral surface of the ring-shaped member, and the contact face is contactable with the ring-shaped member of another cell holding member when the cell holding members are connected to each other.

5. A battery holder as claimed in claim 4, further comprising:
 at least one coupling member which is provided for connecting two of the ring-shaped members, wherein:
 the coupling member has two ends, one end being connected to one of the two ring-shaped members and the other end being connected to the other ring-shaped member, in a manner such that the two ends are both rotatable around a rotation center; and
 the contact face of one of the two ring-shaped members is contactable with the contact face of the other ring-shaped member by rotating the two ends.

6. A battery holder as claimed in claim 4, wherein:
 each ring-shaped member has at least a pair of a convex portion and a concave portion which are provided on the contact face; and
 the cell holding members are detachably connected to each other by fitting the convex portion of the ring-shaped member of one cell holding member into the concave portion of the ring-shaped member of another cell holding member.

7. A battery box into which a battery holder as claimed in claim 6 is detachably built, the battery box comprising;
 a container formed by connecting an upper portion, a lower portion, a front portion, a rear portion, and two side portions, wherein the container can be disassembled and each of the upper, lower. front, and rear portions has an concave portion and a convex portion which are detachably engaged with the convex portion and the concave portion of the ring-shaped member of one of the cell holding member.

8. A battery holder as claimed in claim 4, which is made of an electrically insulating material.

9. A battery holder as claimed in claim 4, wherein each ring-shaped member has a protruding portion on an inner-peripheral surface of the ring-shaped member, wherein the protruding portion contacts an outer-peripheral surface of the cell inserted into the ring-shaped member.

* * * * *